United States Patent
Pajerski et al.

(10) Patent No.: US 8,575,256 B2
(45) Date of Patent: Nov. 5, 2013

(54) DISPERSION OF HYBRID POLYURETHANE WITH OLEFIN-ACRYLIC COPOLYMERIZATION

(75) Inventors: Anthony D. Pajerski, Broadview Heights, OH (US); Robert J. Pafford, IV, North Royalton, OH (US); Naser Pourahmady, Solon, OH (US); Libin Du, Forest Hills, NY (US); James D. Burrington, Gates Mills, OH (US); Stuart L. Bartley, Wickliffe, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 139 days.

(21) Appl. No.: 13/126,852

(22) PCT Filed: Oct. 28, 2009

(86) PCT No.: PCT/US2009/062289
§ 371 (c)(1),
(2), (4) Date: Jun. 21, 2011

(87) PCT Pub. No.: WO2010/051293
PCT Pub. Date: May 6, 2010

(65) Prior Publication Data
US 2011/0245399 A1    Oct. 6, 2011

Related U.S. Application Data

(60) Provisional application No. 61/110,015, filed on Oct. 31, 2008.

(51) Int. Cl.
C08L 33/04    (2006.01)
C08L 75/04    (2006.01)
C08L 31/00    (2006.01)
C08J 3/07     (2006.01)
C08F 2/04     (2006.01)
C08F 118/02   (2006.01)

(52) U.S. Cl.
USPC .......... 524/457; 524/507; 524/501; 524/556; 526/89; 526/319

(58) Field of Classification Search
USPC ............... 524/457, 507, 501, 556; 977/779; 526/89, 319
See application file for complete search history.

(56) References Cited

FOREIGN PATENT DOCUMENTS

| EP | 308115 A   | * | 3/1989 |
| EP | 0308115 A2 |   | 3/1989 |
| EP | 308115 A2  | * | 3/1989 |
| EP | 0778298 A2 |   | 6/1997 |
| EP | 1172407 A2 |   | 1/2002 |

* cited by examiner

Primary Examiner — Michael Bernshteyn
(74) Attorney, Agent, or Firm — Samuel B. Laferty

(57) ABSTRACT

A product and processes comprising urethane polymer and at least one copolymer from a hydrophobic ethylenically unsaturated $C_4$-$C_{30}$ olefins copolymerized with polar monomers such as acrylates. One process optionally utilizes an acid source to modify/catalyze the reactivity of the polar monomer and/or radically activated repeat unit from the polar monomer to promote incorporation of the ethylenically unsaturated olefin. Other processes vary depending on which polymer if formed and/or dispersed first. The hybrid copolymer shows excellent adhesion to a variety of polymeric and/or polar substrates such as polyolefins, acrylate coatings, wood, etc.

21 Claims, No Drawings

DISPERSION OF HYBRID POLYURETHANE WITH OLEFIN-ACRYLIC COPOLYMERIZATION

CROSS REFERENCE TO RELATED APPLICATION

This application claims priority from PCT Application Serial No. PCT/US2009/062289 filed on Oct. 28, 2009, which claims the benefit of U.S. Provisional Application No. 61/110,015 filed on Oct. 31, 2008.

FIELD OF INVENTION

The field is the copolymerization of non-polar $C_4$-$C_{30}$ ethylenically unsaturated aliphatic olefins with monomers containing electron withdrawing groups such as acrylates/acrylics within a polyurethane dispersion. The dispersion media is preferably aqueous. The resulting copolymer is a stable emulsion or dispersion of hybrid polymer particles in aqueous media.

BACKGROUND OF THE INVENTION

Ethylenically unsaturated olefins without heteroatom substitution typically have low copolymerization rates with polar monomers such as acrylates. The copolymerization technology of olefins with polar monomers is reviewed in WO 03/070783 and WO 2005/054305, both owned by PPG Industries Ohio, Inc. The olefins are described as electron donating type monomers and the acrylates are described as electron accepting monomers.

In WO 03/070783, Examples A and B of the copolymers they feed 3 or 4 different charges into a reaction vessel over several hours maintaining a temperature of 140-160° C. and pressures from 5 psi to 62 psi in Example A and 40 to 360 psi in Example B. Molecular weights were number averages of 2293 and 4274 while the weight averages were 8317 and 12,856 gram/mole. These copolymers were blended with more conventional latexes and made into curable film forming compositions.

In WO 2005/054305, Examples 1-4 were 25/20/55 w/w/w of isobutylene/hydroxypropyl acrylate/butyl acrylate polymerized into a copolymer by the method of the patent application. The monomers and di-t-amyl peroxide were prepared in three separate feed tanks and commingled in a feed line just prior to addition to the 5-gallon stirred reactor. The reactor was maintained between 200 and 210° C. and at a pressure of 500 psi for a residence time of 16 to 25 minutes, The resulting polymer was reported to have a composition of 21 wt. % isobutylene, 27 wt. % hydroxypropyl acrylate, and 52 wt. % butyl acrylate. The copolymer was reported to have number average molecular weights between 1446 and 1699 and weight average molecular weights between 2781 and 3441 g/mole.

U.S. Pat. No. 4,198,330 discloses the modification of polyurethane dispersions by polymerization of acrylic monomers in the presence of the waterborne polyurethane particle.

U.S. Pat. No. 3,705,164 teaches the use of acetone as a diluent in the prepolymer to prepare aromatic polyurethane dispersions free of NMP that are further modified with a polyacrylic polymer.

U.S. Pat. No. 5,662,966 teaches the preparation of aromatic polyurethanes that are NMP free using acetone in the prepolymer using dhnethyloi butanoic acid as a dispersing diol agent.

U.S. Pat. No. 5,637,639 discloses NMP free polyurethane compositions that use low amounts of acetone as a diluent in the prepolymer.

U.S. Pat. No. 4,655,030 discloses the preparation of aliphatic polyurethane-acrylic dispersions via a process that renders them free of NMP.

U.S. Pat. No. 5,137,961 discloses the preparation of surfactant free and solvent free polyurethane-acrylic dispersions.

U.S. Pat. No. 4,927,876 discloses the preparation of waterborne polyurethane and urethane acrylic compositions containing diphenyhnethane diisocyanate and using NMP as a diluent in the prepolymer.

U.S. Pat. No. 6,239,209 teaches the preparation of oxidatively curable aromatic polyurethane-acrylics using NMP as a diluent in the prepolymer.

WO 99/16805 discloses aqueous polymer dispersions containing a water-dispersed polyurethane polymer and a vinyl (preferably acrylic) polymer.

WO2006/002865 discloses NMP free aromatic polyurethane and urethane-acrylic compositions that use methyl ethyl ketone as a diluent in the prepolymer.

SUMMARY OF THE INVENTION

A polymeric reaction product resulted from free radically polymerizing a) at least one ethylenically unsaturated aliphatic olefin with 2 or 4 to 30 carbon atoms with b) at least one ethylenically unsaturated monomer containing an electron withdrawing group, and c) optionally other ethylenically unsaturated monomers forming a copolymer comprising repeating units within the same copolymer from said at least one aliphatic olefin and said at least one monomer containing electron withdrawing group(s) in a polyurethane prepolymer dispersion in water with a free radical initiator source, optionally in the presence of a Lewis or Brönsted acid. This polymeric reaction product is a stable emulsion of hybrid urethane-olefin-acrylic particles in aqueous media with good film formation properties. A film from the hybrid particles was found to have many desirable properties such as variable glass transition temperature, good barrier properties with respect to water and solvents, and a relatively hydrophobic surface.

DETAILED DESCRIPTION OF THE INVENTION

This invention relates to compositions and processes to prepare waterborne polyurethane-polyolefin-acrylic hybrids and copolymers prepared using a waterborne polyurethane "seed" particle to host the olefin-acrylic polymerization. The polyurethane portion of the composition would be similar to those conventionally used to prepare waterborne polyurethane dispersion and would be based on aliphatic and/or aromatic di or poly-isocyanates, polyols (typically polyester, polyether and/or polycarbonate), short chain diols, dispersing diols (anionic, cationic, non-ionic or combinations thereof), and optionally chain extended with a diamine (including hydrazine). The polyolefin-acrylic portion of the composition would be composed of $C_4$-$C_{30}$ olefins, optimally alpha-olefins, in combination with acrylic (and optionally styrene) monomers; the mole ratio of olefin to acrylic monomers would be between 80:20 to 20:80, in another embodiment from 2:98 to 49:51; in a third embodiment between 3:97 or 4:96 to 35:65; and in a fourth embodiment from 5:95 to 20:80. An advantage of using a polyurethane seed as a component to carry out the olefin-acrylic polymerisation that the polyurethane can act as an effective carrier and polymerization platform for higher olefins (typically greater than C12) which are known to be difficult to polymerize by conventional emulsion polymerization techniques.

The resulting polyurethane-polyolefin-acrylic hybrid would give an IPN or interpenetrating polymer network of the polyurethane and polyolefin-acrylic, optionally with the more hydrophobic polyolefin-acrylic residing preferentially within the shell of the waterborne particle. However, it is also anticipated that copolymers of the polyurethane and polyolefin-acrylic can also be obtained by optionally using the Lubrizol RAFT diol or "mono-ol" as a component in the preparation of the polyurethane polymer as described in WO02/020281 for polyurethane-acrylic copolymers. The RAFT based copolymers are anticipated to give a more uniform (e.g., homogeneous) distribution of the polyurethane urethane and polyolefin-acrylic components based on previous observations for RAFT based urethane-acrylic (and methacrylate) copolymers. The waterborne polyurethane-polyolefin-acrylic hybrids could also be prepared using a starting polyurethane-olefin-acrylic seed (instead of a polyurethane seed). The hybrid concept could help avoid the use of co-solvents such as N-methyl pyrrolidone (NMP) which are often used to process conventional waterborne polyurethanes. The weight ratio of polyurethane to polyolefin-acrylic polymer would be in the range of 2:98 to 98:2, in another embodiment from 90:10 to 10:90, in a third embodiment from 20:80 to 80:20, in a fourth embodiment in the range of 30:70 to 50:50 to emphasis the properties and advantages brought by the polyolefin-acrylic portion of the composition. These anticipated advantages include improved wetting and adhesion performance to various substrates, particularly those with low surface energy, improved chemical resistance and barrier properties and improved cost-performance characteristics for the final product. Moreover, the tactile properties can be affected by the use of larger olefins.

Prior acrylate coatings provide many attractive performance properties, including good film-forming properties, balance of hard/soft (glass transition), adhesion to polar substrates (wood, metal, paper, polyester, nylon, ABS, concrete, etc.), oil resistance (with acrylonitrile added as monomer), and some moisture resistance by adding styrene monomer. Prior art urethane coatings offered durable surfaces but some sensitivity to polar solvents was noted.

To add certain properties associated with olefinic monomers, it is necessary to incorporate hydrophobic (hydrocarbon-like aliphatic olefin(s)) components into the acrylic polymer. Some conventional ways of doing this include the use of acrylate esters of long chain alcohols, such as 2-ethylhexyl acrylate, or esters of versatates, such as dodecyl versatate, the use of an olefin/acrylate compatibilizer such as polymeric surfactants and the use of a fatty acid chain transfer agent. Ethylhexyl diesters of maleic acid are also thought to impart hydrophobicity and adhesion to olefins. These methods increase cost and are limited in the amount of hydrophilic component that can be incorporated.

The direct incorporation of aliphatic olefin into the acrylic (acrylate) polymer backbone within a urethane prepolymer provides the potential for a low cost, versatile method for achieving the properties of a hydrophobically modified hybrid urethane-acrylate polymer coating. Although such a process has been a subject of study by polymer chemists for many years, these efforts have met with limited success.

This disclosure describes a free-radical system (optionally utilizing Brönsted or Lewis acid) that can co-polymerize olefins in urethane prepolymer or urethane prepolymer dispersion in conventional copolymerization reactors at conventional acrylate polymerization temperatures and pressures.

The solid or soluble versions of Lewis or Brönsted acids are optionally part of the catalyst system with an aqueous media polymerization process, wherein the free radical initiator is selected from any known to those in this art, including peroxides (e.g, dibenzoylperoxide), hydroperoxides (e,g., t-butylhydroperoxide), persulfates (e.g., sodium persulfate) or azo compounds (e.g, azobisisobutyronitrile, AIBN), redox initiator systems, and mixtures of these conventional free radical initiators.

The monomers (which will be described later in more detail) are independently selected from:
 a) an ethylenically unsaturated aliphatic alpha olefin, including but not limited to isobutylene, diisobutylene, nonene, or any other olefin containing a terminal olefin group, olefins with the beta carbon di-alkyl-substituted are preferred in one embodiment,
 b) at least one ethylenically unsaturated monomer containing an electron withdrawing group, alternatively described as an ethylenically unsaturated monomer containing a carbonyl or nitrogen group, such as, an acrylate acid or ester including acrylic acid, methyl acrylate or ethyl acrylate, 2-ethylhexyl acrylate, or any normal or branched alkyl acrylate with an alcohol component of 1 to 32 carbon atoms, and
 c) optionally methacrylic acid or ester, styrene, acrylonitrile, vinyl chloride, vinyl amide or any other free-radically-polymerizable olefin, and/or an electron rich olefin, including vinyl ethers or esters.

More specifically, in one embodiment, the optional soluble or solid acid component can be any solid containing Lewis or Brönsted acid groups. Examples of solid Brönsted acids are acidified clays (e.g., Engelhard F-24, superfiltrol or Sud-Chemic Tonsil® catalysts), sulfonated styrene divinylbenzene copolymers (Rohm and Haas Amberlyst® catalysts), heteropolyacids such as phosphotungstic acid ($H_3PW_{12}O_{40}$), fumed silica, silica/aluminas or zeolites. Examples of Lewis acids include any transition metal compound that is soluble or dispersible in the emulsion media, (including naphthenates of Fe, Co, Ni, Mn, Cr, or Mo) or solid or solid supported versions containing transition metal ions such as $Fe_2O_3$ on alumina, or any of the above-mentioned soluble or dispersable transition compounds on a solid support such as montmorilinite (Bentonite) clays, silca, alumina, silica-aluminas and the like.

In another embodiment, liquid or water soluble Lewis or Brönsted acids (to the extent that they are inherently or can be made to be stable in the presence of water or in an aqueous media) can be selected from those disclosed in the prior art. Liquid or soluble Lewis or Brönsted acids (when stable in a medium containing water) may be difficult to remove and may contribute to degradation or color in the polymer, which, may be undesirable. Examples of liquid or water soluble Lewis or Brönsted acids include free radically polymerizable acids such as monomers containing carboxylic acid, phosphonic acid, sulfonic acid, etc., such as acrylic acid, itaconic acid, maleic acid, AMPS (acrylamide(2-methyl propane sulfonic acid) (available from Lubrizol Advanced Materials, Inc. in Cleveland, Ohio), etc. In one embodiment, the pKA value of the Lewis or Brönsted acid source is less than 6. In some limited embodiments, it may be desirable to exclude from the copolymer or reaction product (e.g., claim as free of, substantially free of, or having less than 100, 50, 25, 10, 5, 2, or 1 ppm based on the weight of all monomers to the polymerization recipe) either monomers containing acid groups (e.g., containing any of sulfonic, carboxylic, and phosphonic acid) or individually exclude using the same values the sulfonic, carboxylic, or phosphonic acid containing monomers.

Definitions. Unless otherwise indicated, the following terms have the following meanings:

As used herein, the term "wt. %" means the number of parts by weight of monomer per 100 parts by weight of polymer or copolymer on a dry weight basis, or the number of parts by weight of ingredient per 100 parts by weight of specified composition.

As used herein, the term "molecular weight" means number average molecular weight unless otherwise specified.

"Polymer" means a chemical substance consisting of one or more repeating units characterized by the sequence of one or more types of monomer derived units (monomer residues) and comprising a simple weight majority of molecules containing at least 3 monomer derived units which are covalently bound to at least one other monomer derived unit or other reactant. Such molecules can be distributed over a range of molecular weights and can be characterized by number-average and/or weight-average molecular weights and polydispersity index.

In this document, "polyurethane" is a generic term used to describe urethane polymers including oligomers (e.g., prepolymers) which contain multiple urethane groups, i.e., —O—C(=O)—NH—, regardless of how they are made. As well known, polyurethanes can contain additional groups such as urea, allophanate, amide, biuret, carbodiimide, carbonyl, oxazolidinyl, isocynaurate, uretdione, ether, ester, carbonate, etc., in addition to urethane groups. Typically, the prepolymers will be from about 1,000 to about 3,000 Daltons in number average molecular weight and if chain extended during the processing can reach number average molecular weights in the millions of Daltons.

"Aqueous medium" means a composition containing a substantial amount of water. It may contain other ingredients as well.

The ethylenically unsaturated aliphatic olefin monomer(s) that are copolymerized with the polar monomers optionally using the Brönsted or Lewis acid of this disclosure are unsaturated olefins with in one embodiment from 2 to 30 carbon atoms, in another embodiment from 4 or 5 to 30 carbon atoms, and in third embodiment desirably 4 or 5 to 20 carbon atoms. Desirably they are monounsaturated. They include branched and cyclic olefins but in preferred embodiments do not include styrenic monomers where the aliphatic nature is concluded after the first two carbon atoms of the ethylenic unsaturation. In one embodiment, the ethylenically unsaturated olefin monomer(s) do not include any atoms other than carbon and hydrogen, i.e., they are entirely hydrocarbon. In one embodiment, the formula of these molecules is $CH_2=CR'R''$ where R' is a linear or branched $C_1$ to $C_{28}$ alkyl that may be linear, branched or cyclic and R" is hydrogen or a linear or branched alkyl as set forth for R', with the proviso that R' and R" together have no more then 28 carbon atoms. In one embodiment, it is desirable that R" is a linear or branched alkyl of 1 to 4 carbon atoms. Olefins where both R' and R" are $C_1$ or higher are believed to be more co-polymerizable with the other monomers than olefins where one of R' or R" is hydrogen. Examples of ethylenically unsaturated aliphatic olefins include butylene, isobutylene, diisobutylene, pentene, hexene, octene, dodecene and other linear and branched olefins.

Free-Radical Polymerizable Monomers. Examples of free radical co-polymerizable monomers which are useful in forming the copolymers of this invention include acrylic esters, methacrylic esters, unsaturated nitrites, styrenic monomers, vinyl esters, vinyl ethers, conjugated dienes, olefins, halogenated (e.g., vinyl chloride and vinylidene chloride), allyl and other monomers, and mixtures thereof. The preferred ethylenically unsaturated monomers for achieving copolymerization with the ethylenically unsaturated aliphatic olefins, optionally in the presence of a Brönsted or Lewis acid are those with electron withdrawing groups or including carbonyl or nitrogen containing groups, such as the acrylates, ethylenically unsaturated monomers with carboxylic acid groups such as acrylic acid, nitrile monomers such as acrylonitrile, vinyl amides, etc. Desirably, the monomers with the electron withdrawing groups are characterized by the electron withdrawing group having a sigma σ (inductive component) value from 0.1 to 0.9 according to Bromilow et al., J. Org. Chem., 44, 4766 (1979). Later listed monomers that do not meet the definitions for achieving copolymerization with ethylenically unsaturated aliphatic olefins are listed as optional monomers to provide other properties to the copolymer(s). The list of monomers below includes some monomers that may have basic functional groups that interact unfavourably with the Lewis or Brönsted acids (possibly forming salts). It is anticipated that one skilled in the art would use such monomers with basic functional groups in such a way or in such limited amounts as not to interfere with the function of the Lewis or Brönsted acid in catalyzing the copolymerization of the ethylenically unsaturated olefin of 4 to 30 carbon atoms with the polar carbonyl containing monomer.

Specific examples include acrylic esters and methacrylic acid esters having the formula I:

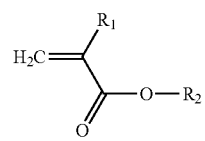

I wherein $R_1$ is hydrogen, methyl, or ethyl group, and $R_2$ contains about 1 to 100 carbon atoms, more typically 1 to 50 or 1 to 25 or 32 carbon atoms, and optionally, also one or more sulfur, nitrogen, phosphorus, silicon, halogen or oxygen atoms. Examples of suitable (meth)acrylate esters include methyl (meth)acrylate, ethyl (meth)acrylate, n-propyl (meth)acrylate, n-butyl (meth)acrylate, isopropyl (metb)acrylate, isobutyl (meth)acrylate, tert-butyl (meth)acrylate, n-amyl (meth)acrylate, n-hexyl (meth)acrylate, isoamyl (meth)ecrylate, 2-hydroxyethyl (meth)acrylate, 2-hydroxypropyl (meth)acrylate, 4-hydroxybutyl (meth)acrylate, N,N-dimethylaminoethyl (meth)acrylate, N,N-diethylaminoethyl (meth)acrylate, t-butylaininoethyl (meth)acrylate, 2-sulfoethyl (meth)acrylate, trifluoroethyl (meth)acrylate, glycidyl (meth)acrylate, benzyl (meth)acrylate, allyl (meth)acrylate, 2-n-butoxyethyl (meth)acrylate 2-chloroethyl (meth)acrylate, sec-butyl-(meth)acrylate, tert-butyl (meth)acrylate, 2-ethylbutyl (meth)acrylate, cinnamyl (meth)acrylate, crotyl (meth)acrylate, cyclohexyl (meth)acrylate, cyclopentyl (meth)acrylate, 2-ethoxyethyl (meth)acrylate, furfuryl (meth)acrylate, hexatluoroisopropyl (meth)acrylate, methallyl (meth)acrylate, 3-methoxybutyl (meth)acrylate, 2-methoxybutyl (meth)acrylate, 2-nitro-2-methylpropyl (meth)acrylate, n-octyl (meth)acrylate, 2-ethylhexyl (meth)acrylate, 2-phenoxyethyl (meth)acrytate, 2-phenylethyl (meth)aerylate, phenyl (meth)acrylate, propargyl (meth)acrylate, tetrahydrofurfuryl (meth)acrylate, norbornyl (meth)acrylate, acrylamide and its derivatives, and tetrahydropyranyl (meth)acrylate. Mixtures of acrylic and methacrylic acid esters may be used The polymerized acrylic and methacrylic acid esters typically may comprise up to 50, 75, 90 or 95 wt. % of the copolymer, depending on the amount of ethylenically unsaturated olefin desired in the copolymer. Esters similar to acrylic and methacrylic include esters of vinyl monoxx ers have t two or more carboxylic groups such as itaconic, fumaric, and maleic acids.

Unsaturated nitrile monomers include acrylonitrile or an alkyl derivative thereof, the alkyl preferably having from 1 to 4 carbon atoms, such as acrylonitrile, methacrylonitrile, and the like. Also suitable are unsaturated monomers containing a cyano group such as those having the formula II:

$$CH_2=C(R^3)CO(O)CH_2CH_2CN \qquad (II)$$

wherein $R^3$ is H or $C_nH_{2n+1}$ and n is 1 to 4 carbon atoms. Other examples of unsaturated nitrile monomers include $CH_2=C(CN)_2$, $CH_3$—CH=CH—CN, NC—CH=CH—CN, 4-pentenenitrile, 3-methyl-4-pentenenitrile, 5-hexenenitrile, 4-vinyl-benzonitrile, 4-allyl-benzonitrile, 4-vinyl-cyclohexanecarbonitrile, 4-cyanocyclohexene, and the like. Mixtures of the unsaturated nitriles may also be used. Acrylonitrile and methacrylonitrile are prefered. In some embodiments, the polymerized unsaturated nitrile monomers typically may comprise no more than about 60 wt. %, more typically no more than 20 wt. %, 15 wt. %, 10 wt. % 5 wt. % or 3 wt. % of the copolymer.

The "styrenic monomers" useful in preparing the hydrophilic polymer(s) of this invention may be defined as monomers containing a carbon-carbon double bond in the alpha-position to an aromatic ring. For the purpose of this disclosure, styrenic monomers will be considered neither to be ethylenically unsaturated aliphatic olefins nor ethylenically unsaturated monomers with electron withdrawing groups. Notwithstanding, styrenic monomers may be included as co-monomer(s) in making, the copolymers of this invention. Examples of suitable styrenic monomers include styrene, alpha-methylstyrene, tertiary butylstyrene, ortho, meta, and para-methylstyrene, ortho-, meta- and para-ethyl-styrene, o-methyl-p-isopropylstyrene, p-chlorostyrene, p-bromostyrene, o,p-dichlorostyrene, o,p-dibromostyrene, ortho-, meta- and para-methoxystyrene, indene and its derivatives, vinylnaphthalene, diverse vinyl (alkyl-naphthalenes) and vinyl (halonaphthalenes) and mixtures thereof, acenaphthylene, diphenylethylene, and vinyl anthracene. Mixtures of styrenic monomers also may be used. Styrene and alpha-methylstyrene are preferred. In some embodiments where the repeating units from styrene type monomers are undesirable, the polymerized styrenic monomers typically may comprise no more than about than 80 wt. %, 60 wt. %, 40 wt.%, 20 wt. %, 10 wt, % or 5 wt. % of the copolymer.

Vinyl ester monomers derived from carboxylic acids containing 1 to 100, more typically 1 to 50 or 1 to 25, carbon atoms also may be useful in preparing the vinyl polymer of the present invention. Examples of such vinyl ester monomers include vinyl acetate, vinyl propionate, vinyl hexanoate, vinyl 2-ethylhexanoate, vinyl octanoate, vinyl pelargonate, vinyl caproate, neo esters of vinyl alcohol, vinyl laurate, vinyl versatate and the like, as well as mixtures thereof. The polymerized vinyl ester monomers typically may comprise from 0 wt. % to about 99.5 wt. % of the vinyl polymer of the present invention.

Vinyl ethers may be useful in preparing the copolymer of the present invention. Examples of vinyl ethers include methyl-, ethyl-, butyl, iso-butyl vinyl ethers and the like. In one embodiment, the polymerized vinyl ether monomers typically may comprise from 0 wt. % to about 60 wt. %, preferably from 0 wt. % to about 50 wt. %, of the vinyl polymer of the present invention.

Conjugated diene monomers containing 4 to 12 carbon atoms, and preferably from 4 to 6 carbon atoms, also may be useful in preparing the polymer of the present invention. Examples of such conjugated diene monomers include butadiene, isoprene, pentadiene, and like, as well as mixtures thereof. Butadiene is preferred. As expressed earlier, diene monomers contribute to UV light sensitivity and possibly accelerate polymer degradation under UV light. Thus, in some embodiments where UV light will be present, the copolymers have less than 50, more desirably less than 30, more desirably less than 10 or 20, and preferably less than 5 wt. % repeating units from diene monomers.

Olefin monomers outside one or more of the definition(s) of ethylenically unsaturated aliphatic olefins containing 4 to 30 carbon atoms may also be useful in preparing the vinyl polymer of the present invention. Examples of such olefins include ethylene and propylene, as well as mixtures thereof. Cyclic olefins may also be used such as vinyl cyclohexane, cyclopentane, cyclohexene, cyclooctadiene, norbornene, norbornadiene, pinene and like. In one embodiment, the copolymer may typically be comprised from 0 or 1 wt. % to about 50 wt. %, from 0 or 1 wt. % to about 20 or 30 wt. %, or from 0 wt. % to about 5 or 10 wt. %, of repeating units from ethylene, propylene or cyclic olefin monomers.

Ethylenically unsaturated monomers comprising fluorine, chlorine, bromine, and iodine may be useful in preparing the copolymer of the present invention. They may contain 2 to 100 carbon atoms and at least one halogen atom. Examples of such monomers include vinyl fluoride, vinyl chloride, vinyl bromide, vinylidene fluoride, vinylidene chloride, halogenated (meth)acrylic and styrenic monomers, allyl chloride and like, as well as mixtures thereof. Sometimes halogenated monomers or their repeating units are sensitive to degradation catalyzed by Lewis or Brönsted acids. Thus, in some embodiments, the copolymer of this invention will comprise less than 50 wt. %, more desirably less than 20 or 30 wt. % and more desirably still less than 5 or 10 wt. % of halogenated repeating units from these monomers.

Polar and Hydrophilic Monomers. Another group of monomers which are useful in preparing the copolymers of the present invention are polar monomers such as hydroxy-alkyl (meth)acrylates, (meth)acrylamides and substituted (meth)acrylamides, sodium styrene sulfonate and sodium vinyl sulfonate, N-vinyl-2-pyrrolidone, N-vinyl caprolactam, 2-hydroxyethyl (meth)acrylate, 2-hydroxypropyl (meth) acrylate, 4-hydroxybutyl (meth)acrylate, (4-hydroxymethyl-cyclohexyl)-methyl (meth)acrylate, acrolein, diacetone (meth)acrylamide, 1-(2-((2-hydroxy-3-(2-propenyloxy)pro-pypamino)ethyl)-2-imidazolidinone, N-methylol (trieth) acrylamide, diallyl phosphate, Sipomer® WAM, WAM II (from Rhodia) and other urido-containing monomers, dimethylaminoethyl (meth)acrylate, and dimethylaminopropyl (meth)acrylamide, acrylic acid, methacrylic acid, crotonic acid, maleic acid, itaconic acid, citraconic acid, maleic anhydride, itaconic anhydride, citraconic anhydride, acrylamido (2-methyl propane sulfonic acid), and vinyl phosphonic acid. Mixtures of polar monomers also may be used.

Hydrophilic Monomers and Components. Hydrophilic components (i.e., monomers, chain transfer agents, initiators) have at least one hydrophilic, ionic or potentially ionic group is optionally included in the copolymer to assist dispersion of the polymer, thereby enhancing the stability of the dispersions so made. Typically, this is done by incorporating a compound bearing at least one hydrophilic group or a group that can be made hydrophilic (e.g., by chemical modifications such as neutralization or deblocking) into the polymer chain. These compounds may be of a non-ionic, anionic, cationic or zwitterionic nature or the combination thereof.

For example, anionic groups such as carboxylate, sulfate, sulfonate, phosphate, and phosphonate can be incorporated into the polymer in an inactive form and subsequently activated by a salt-forming compound, such as ammonia, organic amines and alkali metal hydroxides. Other hydrophilic compounds can also be reacted into the polymer backbone, including lateral or terminal hydrophilic ethylene oxide, the organic amines and polyaminelpolyimines previously described as chain extenders for polyurethanes, pyrrolidone or ureido units.

Hydrophilic compounds of particular interest are those which can incorporate acid groups into the polymer such as ethylenically unsaturated monomers having at least one carboxylic acid group, and preferably one or two carboxylic acid groups. Examples of such monomers include acrylic acid, methacrylic acid, itaconic acid, maleic acid, maleic anhydride, fumaric acid, crotonic acid, vinyl acetic acid, mesaconic acid, citraconic acid, 2-acrylamide-2-methylpropanesulfonic acid, styrene sulfonic acid, 2-sulfoethyl (meth) acrylate, alkali metal salts of the above acids and amine or ammonium salts thereof such as sodium allyl sulfonate, sodium 1-allyloxy-2-hydroxypropane sulfornate (COPS 1), 2-acrylamido-2-methyl propane sulfonate (AMPS), sodium dodecyl allyl sulfosuccinate (TREM-LF40), sodium methallyl sulfonate, sodium styrene sulfonate, sodium vinyl sulfonate, sodium vinyl phosphonate, sodium sulfoethyl methacrylate.

Strong acid monomers are also desirable in the copolymer. Examples of ethylenically unsaturated strong acid monomers useful according to the invention include, but are not limited to, 2-acrylamide-2-methylpropane sulfonic acid, 1-allyloxy-2-hydroxypmpane sulfonic acid, vinylsulfonic acid, styrene sulfonic acid, alkyl allyl sulfosuecinic acid, sulphoethyl (meth)acrylate, phosphoalkyl(meth)acrylates such as phosphoethyl methacrylate (phosphate ester of 2-hydroxyethyl methacrylate), phosphoethyl acrylate, phosphopropyl(meth) acrylate, phospbobutyl(meth)acrylate, phosphate ester of polyethyleneglycol(meth)acrylate, phosphate ester of polypropyleneglycol (meth)acrylate, phosphoalkyl crotonates, phosphoalkyl maleates, phosphoalkyl fumarates, phosphodialkyl(meth)acrylates, phosphodialkyl crotonates, vinyl phosphonic acid (VPA) and allyl phosphate. Salts of these unsaturated strong acid monomers are also useful. Diesters and blends of monesters and diesters of the phosphate strong acids are useful also. The term "(meth)acrylate," and the like, as used throughout means either an acrylate, or a methacrylate, or mixtures of both. In a preferred embodiment, the ethylenically unsaturated strong acid monomer is a phosphorous-containing monomer, and especially an unsaturated phosphate ester such as phosphoethyl methacrylate (phosphate ester of 2-hydroxyethyl methacrylate).

Compounds/Monomers Having at Least One Crosslinkable Functional Group. Compounds having at least one crosslinkable functional group can also be incorporated into the vinyl polymers of the present invention, if desired. Examples of such compounds include N-methylol acrylamide (NMA), diacetone acrylamide (DAAM), acetoacetoxy ethyl methacrylate (AAEM), epoxy-containing compounds, —OH containing cornpounds, —COOH containing compounds, isocyanate-containing compounds (TMI), mercaptan-containMg compounds, compounds containing olefinic unsaturation and the like. Mixtures can also be used.

Polyurethane Prepolymer Ingredients

The polyurethane prepolymers of this invention are formed from at least one polyisocyanate, at least one active hydrogen-containing compound containing two or more active hydrogens (e.g., an isocyanate reactive polyol), and optionally, at least one ionic and/or non-ionic water-dispersibility enhancing compound.

Polyisocyanate

Desirably a large proportion of the polyisocyanates used to make the prepolymer and polyurethane of this disclosure are aromatic polyisocyanates. Expressed one way, desirable at least about 20 to 65 part of at least one aromatic polyisocyanate is used, in one embodiment from about 30 to about 60 parts and in another embodiment from about 35 to about 55 parts of polyurethane. Expressed another way desirably at least 75 mole percent, in another embodiment at least 85 or 95 mole %, and in a third embodiment at least 98 mole percent of the total polyisocyanates used to form the prepolymer and polyurethane are aromatic isocyanates. The aromatic polyisocyanates can have two or more isocyanate groups. They may include isomers or oligomers of polyisocyanates that help reduce crystallinity of the as received material so that it is liquid rather than a crystalline solid at room temperature. Examples of suitable aromatic polyisocyanates include 4,4'-diphenylinethylene diisocyanate, its 2,4' isomer, its 2,2'isomer, mixtures thereof, toluene diisocyanate including it 2,4 and 2,6 version, phenylene diisocyanate, polymethylene polyphenyl polyisocyanates, naphthalene diisocyanate, their oligomeric forms, mixtures thereof, and the like. Preferred aromatic polyisocyanates are toluene diisocyanate and diphenylmethylene diisocyanate.

Suitable polyisocyanates in general have an average of about two or more isoeyanate groups, preferably an average of about two to about four isocyanate groups per molecule and comprising about 5 to 20 carbon atoms (in addition to nitrogen, oxygen, and hydrogen) and include aliphatic, cycloaliphatic, aryl-aliphatic, and aromatic polyisocyanates, as well as products of their oligomerization, used alone or in mixtures of two or more. Diisocyanates are more preferred. Aliphatic isocyanates generally tolerate UV exposure better than aromatic isocyanates in terms of low color development on exposure.

Examples of aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like.

Examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl) cyclohexane, and the like.

Examples of aralipahtic polyisocyanates include m-tetramethyl xylylene diisocyanate, p-tetramethyl xylylene diisocyanate, 1,4-xylylene diisocyanate, 1,3-xylylene diisocyanate, and the like.

(ii) Active Hydrogen-Containing Compounds

Any compound that provides a source of active hydrogen for reacting with isocyanate groups via the following reaction: —NCO+H—X→—NH—C(=O)—X, can be used as the active hydrogen-containing compound in this invention. Examples include but are not limited to polyols, polythiols and polyamines.

"Polyol" in this context means an product having an average of about two or more hydroxyl groups per molecule (e.g., isocyanate reactive polyol). Examples include low molecular weight products called "extenders" with number average molecular weight less than about 500 Dalton such as aliphatic, cycloaliphatic and aromatic polyols, especially diols, having 2-20 carbon atoms, more typically 2-10 carbon atoms, as well as "macroglycols," i.e., polymeric polyols having molecular weights of at least 500 Daltons, more typically about 1,000-10,000 Daltons, or even 1,000-6,000 Daltons. Examples of such macroglycols include polyester polyols including alkyds, polyether polyols, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols and hydrogenated polybutadiene polyols, polyisobutylene polyols, polyacrylate polyols, halogenated polyesters and polyethers, and the like, and mixtures thereof. The polyester polyols, polyether polyols, polycarbonate polyols, polysiloxane polyols, and ethoxylated polysiloxane polyols are preferred.

In one embodiment, it is desirable to have 20 or 25 to 55 or 60% by weight of isocyanate reactive polyols incorporated in the prepolymer or polyurethane component. In one embodiment, these have a number average molecular weight above 500 Daltons per mole. In one embodiment, it is desirable to have one of the polyols be derived from or characterized as a polypropylene glycol) polyol, e.g., polypropylene oxide). In one embodiment, it is desirable that the weight ratio of poly (propylene glycol) polyol to the other polyols be from about 10:90 to 90:10.

The polyester polyols typically are esterification products prepared by the reaction of organic polycarboxylic acids Or their anhydrides with a stoichiometric excess of a diol or diols. Examples of suitable polyols for use in the reaction include poly(glycol adipate)s, poly(ethylene terephthalate) polyols, polycaprolactone polyols, alkyd polyols, orthophthalic polyols, sulfonated and phosphonated polyols, and the like, and mixtures thereof.

The diols used in making the polyester polyols include, alkylene glycols, e.g., ethylene glycol, 1,2- and 1,3-propylene glycols, 1,2-, 1,3-, 1,4-, and 2,3-butylene glycols, hexane diols, neopentyl glycol 1,6-hexanedio1,8-octanediol, and other glycols such as bisphenol-A, cyclohexane diol, cyclohexane dimethanol (1,4-bis-hydroxyznothyleycohexane), 2-methyl-1,3-propanediol, 2,2,4-trimethyl-1,3-pentanediol, diethylene glycol, triethylene glycol, tetraethylene glycol, polyethylene glycol, dipropylene glycol, polypropylene glycol, dibutylene glycol, polybutylene glycol, dimerate diol, hydroxylated bisphenols, polyether glycols, halogenated diols, and the like, and mixtures thereof. Preferred diols include ethylene glycol, diethylene glycol, butylene glycol, hexane diol, and neopentyl glycol.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, ehlorendic acid, 1,2,4-butane-tricarboxylic acic phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic and/or aromatic dibasic acids.

Particularly interesting polyols are the polyester diols, i.e., any compound containing the —C(=O)—O— group. Examples include poly(butanediol adipate), caprolactones, acid-containing polyols, polyesters made from hexane diol, adipic acid and isophthalic acid such as hexane adipate isophthalate polyester, hexane diol neopentyl glycol adipic acid polyester diols, e.g., Piothane 67-3000 HAI, Piothane 67-500 HAI, Piothane 67-3000 HNA (Panalam Industries) and Piothane 67-1000 HNA; as well as propylene glycol maleic anhydride adipic acid polyester diols, e.g., Piothane 50-1000 PMA; and hexane diol neopentyl glycol fumaric acid polyester diols, e.g., Piothane 67-500 HNF. Other polyester diols include Rucoflex™, S1015-35, S1040-35, and 5-1040-110 (Bayer Corporation).

In one embodiment, the polyol component of the polyurethane is a polyol with air oxidizable or self-crosslinkable unsaturation as described in paragraphs 0016 to 0034 of WO 2006/047746, hereby incorporated by reference. The unsaturation while available for air oxidative crosslinking after film formation is also available to copolymerize with the free-radically polymerizable monomers. To the extent that the free-radically polymerizable monomers copolymerize with oxidizable unsaturation incorporated into the polyurethane, grafting between the two types of polymers will occur. This will occur during the polymerization of the acrylate and olefin monomers initiated by free radical source and possibly by temperature. A preferred polyol is a natural oil modified polyol available from Pioneer Plastics, in Auburn, Me. and sold under the name Piothane® S-500. Such grafting of acrylate type monomers to unsaturation within a oxidatively crosslinkable polyurethane during urethane hybrid formation is also disclosed in U.S. Pat. No. 6,462,127. Another way to incorporate grafting sites into the polyurethane (for grafting between the polyurethane and olefin-acrylate polymer of this disclosure) is to incorporate components reactive in both urethane forming and in free radical polymerization. Such components (often monounsaturated but optionally polyunsaturated) but would also have groups reactive with isocyanates (such as hydroxyls or amine groups) such as 2-hydroxyethyl acrylate. To the extent that such components only have a single isocyanate reactive group, they would typically be chain ends on the urethane prepolymer rather than backbone components as with the oxidatively crosslinking polyols described above. This type of technology is explained in further detail in U.S. Pat. No. 4,730,021.

The polyether polyols that can be used as the active hydrogen-containing compound in accordance with the present invention contain the —C—O—C— group. They can be obtained in a known manner by the reaction of (A) the starting compounds that contain reactive hydrogen atoms, such as water or the diols set forth for preparing the polyester polyols, and (B) alkylene oxides, such as ethylene oxide, propylene oxide, butylene oxide, styrene oxide, tetrahydrofuran, epichlorohydrin, and the like, and mixtures thereof. Preferred polyethers include poly(propylene glycol), polytetrahydrofuran, and copolymers of polyethylene glycol) and polypropylene glycol).

Polycarbonate polyols include those containing the —O—C(=O)—O— group. They can be obtained, for example, from the reaction of (A) diols such 1,3-propanediol, 1,4-butanediol, 1,6-hexanediol, diethylene glycol, triethylene glycol, tetraethylene glycol, and the like, and mixtures thereof with (B) diarylcarbonates such as diphenylcarbonate or phosgene. Aliphatic and cycloaliphatic polycarbonate polyols can also be used.

Useful polyhydroxy polyacetals include the compounds that can be prepared from the reaction of (A) aldehydes, such as formaldehyde and the like, and (B) glycols such as di ethylene glycol, triethylene glycol, efhoxylated 4,4'-dihydroxy-diphenyldimethylmethane, 1,6-hexanediol, and the like. Polyacetals can also be prepared by the polymerization of cyclic acetals.

Instead of or in addition to a polyol, other compounds may also be used to prepare the prepolymer. Examples include polyamines, polyester amides and polyamides, such as the predominantly linear condensates obtained from reaction of (A) polybasic saturated and unsaturated carboxylic acids or their anhydrides, and (B) polyvalent saturated or unsaturated aminoalcobols, diamines, polyamines, and the like, and mixtures thereof.

Diamines and polyamines are among the preferred compounds useful in preparing the aforesaid polyester amides and polyamides. Suitable diamines and polyamines include 1,2-diaminoethane, 1,6-diaminohexane, 2-methyl-1,5-pentanediamine, 2,2,4-trimethyl-1,6-hexanediamine, 1,12-diaminododecane, 2-aminoethanol 2-[(2-aminoethyl)amino]-ethanol, piperazine, 2,5-dimethylpiperazine, 1-amino-3-aminomethyl-3,5,5-trimethyl-cyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazin-e, N,N,N'-tris-(2-aminoethyl) ethylene diamine, N-[N-(2-aminoethyl)-2-amino-ethyl]-N'-(2-aminoethyl)-piperazine, N-(2-aminoethyl)-N'-(2-piperazinoethy-1)-ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-tri-aminopyrimidine, polyoxypropylene amines, tetrapropylenepentamine, tripropylenetetramine, N,N-bis-(6-aminohexyl)amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-tri-methyl-cyclohexane (isophorone diamine or IPDA), bis-(4-aminocyclohexyl)-m-ethane, bis-(4-amino-3-methylcyclohexyl)-methane, ethylene diamine, diethylene triamine, triethylene tetramine, tetraethylene pentamine, and pentaethylene hexamine, and the like, and mixtures thereof. Other suitable diamines and polyamines include Jeffamine™. D-2000 and D-4000, which are amine-terminated polypropylene glycols, differing only by molecular weight, and which were available from Huntsman Chemical Company.

Low molecular weight alkylene polyols (e.g., glycerol, trimethylol propane, etc.) can be used as urethane branching agents. Branching can provide beneficial properties to a urethane polymer and can provide additional functional (reactive) end groups (generally above 2 as one goes from a linear oligomers to a branched oligomers or polymer) for each urethane prepolymer or polymer.

Water-Dispersibility Enhancing Compounds

Polyurethanes are generally hydrophobic and not water-dispersible. In accordance with one embodiment of the invention, therefore, at least one water-dispersibility enhancing compound (i.e., monomer), which has at least one, hydrophilic (e.g., poly(ethylene oxide)), ionic or potentially ionic group is optionally included in the polyurethane prepolymer to assist dispersion of the polyurethane prepolymer as well as the chain-extended polyurethane made therefrom in water, thereby enhancing the stability of the dispersions so made. Often these are diols or polyols containing water-dispersibility enhancing functionality. Often these are of less than 500 number average molecular weight if ionizable. In one embodiment, it is desirable to have about 0, 1 or 2 to about 10 or 12% by weight of a diol, polyol or polyols or combinations thereof bearing active hydrogen groups as and containing a ionizable or potentially ionizable water dispersing group solubilised in either b) a vinyl monomer or c) a reactive polyol or a combination thereof. Typically, this is done by incorporating a compound bearing at least one hydrophilic group or a group that can be made hydrophilic (e.g., by chemical modifications such as neutralization) into the polymer chain. These compounds may be of a non-ionic, anionic, cationic or zwitterionic nature or the combination thereof. For example, anionic groups such as carboxylic acid groups can be incorporated into the prepolymer in an inactive form and subsequently activated by a salt-forming compound, such as a tertiary amine defined more fully hereinafter, in order to create a prepolymer having an acid number from about 1 to about 60, typically 1 to about 40, or even 10 to 35 or 12 to 30 or 14 to 25 mg KOH/g. Other water-dispersibility enhancing compounds can also be reacted into the prepolymer backbone through urethane linkages or urea linkages, including lateral or terminal hydrophilic ethylene oxide or ureido units.

Water dispersibility enhancing compounds of particular interest are those which can incorporate carboxyl groups into the prepolymer. Normally, they are derived from hydroxy-carboxylic acids having the general formula $(HO)_x Q (COOH)_y$, wherein Q is a straight or branched hydrocarbon radical containing 1 to 12 carbon atoms, and x and y are 1 to 3. Examples of such hydroxy-carboxylic acids include dimethylolpropanoic acid (DMPA), dimethylol butanoic acid (DMBA) (most preferred), citric acid, tartaric acid, glycolic acid, lactic acid, malic acid, dihydroxymalic acid, dihydroxytartaric acid, and the like, and mixtures thereof. Dihydroxycarboxylic acids are more preferred with dimethylolproanoic acid (DMPA) and dimethylol butanoic acid (DMBA) being more preferred than the others.

Water dispersibility enhancing compounds may include reactive polymeric polyol components that contain pendant anionic groups which can be polymerized into the prepolymer backbone to impart water dispersible characteristics to the polyurethane subsequent to chain extension. The term anionic functional polymeric polyol includes anionic polyester polyols, anionic polyether polyols, and anionic polycarbonate polyols. These polyols include moieties that contain active hydrogen atoms. Such polyols containing anionic groups are described in U.S. Pat. No. 5,334,690, Another group of water-dispersibility enhancing compounds of particular interest are side chain hydrophilic monomers (non-ionic dispersibility enhancing components). Some examples include alkylene oxide polymers and copolymers in which the alkylene oxide groups have from 2-10 carbon atoms as shown, for example, in U.S. Published Patent Application No. 20030195293 to Noveon, Inc. for breathable polyurethane blends, the disclosure of which is incorporated herein by reference.

Other suitable water-dispersibility enhancing compounds include thioglycolic acid, 2,6-dihydroxybenzoic acid, sulfoisophthalic acid (this component would preferably be incorporated as part of a polyester), polyethylene glycol, and the like, and mixtures thereof.

Compounds Having at Least One Crosslinkable Functional Group

Compounds having at least one crosslinkable functional group can also be incorporated into the polyurethane prepolymers of the present invention, if desired. Examples of such compounds include those having carboxylic, carbonyl, amine, hydroxyl, epoxy, acetoacetoxy, urea-formaldehyde, auto-oxidative groups that crosslink via oxidization, ethylenically unsatureated groups optionally with U.V. activation, olefinic and hydrazide groups, blocked isocyanates, and the like, and mixtures of such groups and the same groups in protected forms (so crosslinking, can be delayed until the composition is in its application (e.g., applied to a substrate) and coalescence of the particles has occurred) which can be reversed back into original groups from which they were derived (for crosslinking at the desired time).

Other suitable compounds providing crosslinkability include thioglycolic acid, 2,6-dihydroxybenzoic acid, and the like, and mixtures thereof.

Catalysts

The prepolymer may be formed without the u of a catalyst if desired.

Ingredient Proportions

Normally, the prepolymer produced in the present invention will be isocyanate-terminated. For this purpose, the ratio of isocyanate to active hydrogen in forming the prepolymer typically ranges from about 1.3/1 to about 2.5/1, in one embodiment from about 1.5/1 to about 2.1/1, and in another embodiment from about 1.65/1 to about 2/1.

The typical amount of water-dispersibility enhancing compound (total of all ionic and non-ionic) in the prepolymer will be up to about 50 wt. %, more typically from about 2 wt. % to about 30 wt. %, and more especially from about 2 wt. % to about 10 wt. % based on the total weight of the prepolymer.

The amount of optional compounds having crosslinkable functional groups in the prepolymer will typically be up to about 1 milliequivalent, preferably from about 0.05 to about 1 milliequivalent, and more preferably from about 0.1 to about 0.8 milliequivalent per gram of final polyurethane on a dry weight basis.

Where the compositions of the invention incorporates non-polyurethanic non-vinylic polyhydrazine (or polyhydrazone) compound(s) and/or oligomeric urethane polyhydrazine (or polyhydrazone) compound(s), the level of such polyhydrazine (or polyhydrazone) compounds(s) in one embodiment is that to provide a range of 0.05 to 20 moles hydrazine (or hydrazone) groups present per mole of carbonyl groups present, in another embodiment 0.1 to 10 moles per mole, and in another embodiment 0.67 to 1.11 moles per mole. Examples of such suitable polyhydrazine (or polyhydrazone) compounds include dicarboxylic acid bishydrazides of formula

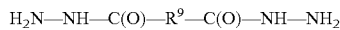
$$H_2N-NH-C(O)-R^9-C(O)-NH-NH_2$$

and dicarboxylic acid bis-hydrazones of formula

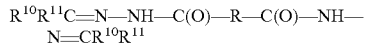
$$R^{10}R^{11}C=N-NH-C(O)-R-C(O)-NH-N=CR^{10}R^{11}$$

wherein $R^9$ is a covalent bond or a polyalkylene (preferably polymethylene) or alicyclic group having from 1 to 34 carbon atoms or a divalent aromatic ring, and $R^{10}$ and $R^{11}$ are selected from the group consisting of H and ($C_1$ to $C_6$) alkyl and alicyclic groups. Examples of suitable dihydrazides include oxalic acid dihydrazide, malonic acid dihydrazide, succinic acid dihydrazide, glutaric acid dihydrazide, adipic acid dihydrazide, cyclohexane dicarboxylic acid bis-hydrazide, azelaic acid bis-hydrazide, and sebacic acid dihydrazide. Other suitable compounds are set forth in U.S. Pat. No. 4,983,662 at column 18, line 3 through column 18, line 42.

The compositions of the invention may optionally contain 0.0002 to 0.02 mole per mole of hydrazine group(s) of a heavy metal ion. This may be added in the form of suitable water-soluble metal salts, particularly chlorides, sulphates, metal hydrazide complexes, and acetates. Suitable heavy metal water-soluble salts are, in particular, those of Cu, Zn, Fe, Cr, Mn, Pb, V, Co and Ni.

The technology for inserting ketone functional groups as part of the polyurethane, part of the acrylic polymer or as a separate component is described more fully in U.S. Pat. No. 4,983,662 to Overbeek et al., and Pajerski in WO 2006/047746, WO2006/08632 and WO2008/06843.

Prepolymer Manufacture

Aqueous dispersions of polyurethane composition particles are made in accordance with this invention by forming a polyurethane prepolymer, optionally with a polyketone molecule, and dispersing this blend in aqueous medium.

Typically, prepolymer formation will be done by bulk or solution polymerizing the ingredients of the prepolymer. Thus, the ingredients forming the prepolymer, e.g., the polyisocyanate(s), the active hydrogen-containing compound(s) and/or the water-dispersibility enhancing compound(s), are combined to form the prepolymer.

Bulk and solution polymerization are well known techniques and described, for example, in "Bulk Polymerization," Vol. 2, pp. 500-514, and "Solution Polymerization," Vol. 15, pp. 402-418, *Encyclopedia of Polymer Science and Engineering*,© 1989, John Wiley & Sons, New York. See, also, "Initiators," Vol, 13, pp. 355-373, Kirk-Othmer, *Encyclopedia of Chemical Technology*,© 1981, John Wiley & Sons, New York. The disclosures of these documents are also incorporated herein by reference.

Dispersion in an Aqueous Medium

Once the polyurethane prepolymer is formed, in one embodiment it is dispersed in an aqueous medium to form a dispersion of the blend.

Dispersing the prepolyiner in aqueous medium can be done by any conventional technique, in the same way that other polyurethane prepolyiners made by bulk or solution polymerization are dispersed in water. Normally, this will be done by combining the prepolymer blend, with water with mixing. When or if solvent polymerization is employed, the solvent and other volatile components can optionally be distilled off from the final dispersion, if desired. Chain extender and/or the hydrazine functional moiety for reacting with the ketone group can be added at this stage or later.

In one embodiment of the invention, where the prepolymer includes enough water-dispersibility enhancing compound to form a stable dispersion without added emulsifiers (surfactants), the dispersion can be made without such compounds, i.e., substantially free of surfactants, if desired. The advantage of this approach is that the coatings or other products made from the polyurethane exhibit less water sensitivity, better film formation, less foaming and reduced growth of mold, bacteria and so forth.

Alternatively, to dispersing the urethane prepolymer directly in water, it may first be formed or put in solution with a polar solvent that is non-reactive with isocyanate functionality and easily distilled. The prepolymer can then be diluted in said solvent(s) as necessary, optionally chain extended with an active hydrogen-containing compound. Water can then be added to the chain-extended polyurethane solution, and the solvent(s) are distilled off. A variation on this process would be to chain extend the prepolymer after its dispersion into water (e.g, with di or higher functionality amines). This process is often called the "Acetone process" in the patent literature as acetone is a popular solvent. Bayer has commercial polyurethane dispersions in water made by this process. Alternatively, there are melt dispersion processes, ketazine and ketimine process, continuous process polymerizations, reverse feed process, solution polymerization and bulk polymerization processes (all disclosed in more detail in U.S. Pat. No. 6,897,281 B2 column 4, lines 20-64) that might be used to make and/or disperse the urethane/prepolymer component of this disclosure.

Prepolymer Neutralization

In those instances in which the prepolymer includes water-dispersibility enhancing compounds which produce pendant carboxyl groups, these carboxyl groups can be converted to carboxylate anions for enhancing the water-dispersibility of the prepolymer.

Suitable neutralizing agents for this purpose include tertiary amines, metal hydroxides, ammonium hydroxide, phosphines, and other agents well known to those skilled in the art. Tertiary amines and ammonium hydroxide are preferred, such as triethyl amine (TEA), dimethyl ethanolamine (DMEA), N-methyl morpholine, and the like, and mixtures thereof. It is recognized that primary or secondary amines may be used in place of tertiary amines, if they are sufficiently hindered to avoid interfering with the chain extension process.

Chain Extension

The polyurethane composition dispersions in water produced as described above can be used as is, if desired. Alternatively, they can be chain extended to convert the prepolymers in the composite particles to more complex polyurethanes.

As a chain extender, at least one of water, inorganic or organic polyamine having an average of about 2 or more primary and/or secondary amine groups, amine functional polyols, ureas, or combinations thereof is suitable for use in this invention. Suitable organic amines for use as a chain extender include diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in this invention are propylene diamine, butylene diamine, hexamethylene diamine, cyclohexylene diamine, phenylene diamine, tolylene diamine, 3,3-dichlorobenzidene, 4,4$^1$-methylene-bis-(2-chloroandine), 3,3-dichloro-4,4-diamino diphenylinethane, sulfonated primary and/or secondary amines, and the like, and mixtures thereof. Suitable inorganic amines include hydrazine, substituted hydrazines, and hydrazine reaction products, and the like, and mixtures thereof. Suitable ureas include urea and it derivatives, and the like, and mixtures thereof. Hydrazine is most preferred or hydrazine combined with other extenders, preferably water soluble ones such as ethylene diamine and is most preferably used as a solution in water. The amount of chain extender, which can be added before or after dispersion, typically ranges from about 0.5 to about 1.15 equivalents based on available equivalents of isocyanate.

Additional Ingredients and Features

The polyurethane prepolymers, the product polyurethanes produced therefrom, and the aqueous prepolymer composition aqueous dispersions of the present invention as described above can be made with various additional ingredients and features in accordance with known polyurethane technology. Examples include:

Polymer Branching

Branching of the ultimate polymer product, as well as the prepolymer, can be accomplished for aiding tensile strength and improving resistance to creep—that is, recovery to that of or near its original length after stretching. In this regard, see U.S. Published Patent Application No. 20030195293, the disclosure of which has been incorporated herein by reference above.

Monofunctional Active Hydrogen-Containing Compounds

The prepolymers of this invention can also be made with monofunctional active hydrogen-containing compounds to enhance dispersibility of the prepolymer in aqueous medium and impart other useful properties, for example cross-linkability, as well as to adjust the morphology and rheology of the polymer when coated onto a substrate, as also described in the above-noted U.S. Published Patent Application No 20030195293.

Plasticizers

The polyurethane prepolymers and ultimate polyurethane products of this invention can be prepared in the presence of a plasticizer. The plasticizer can be added at any time during prepolymer preparation or dispersion or to the polyurethane during or after its manufacture. Plasticizers well known to the art can be selected for use in this invention according to parameters such as compatibility with the particular polyurethane and desired properties of the final composition. See, for example, WO 02/08327 A1, as well as the above-noted U.S. Published Patent Application No. 20030195293.

Other Additives for Preparation of Dispersions

Other additives well known to those skilled in the art can be used to aid in preparation of the dispersions of this invention. Such additives include stabilizers, defoamers, antioxidants (e.g., Irganox 1010), UV absorbers, carbodiimides, activators, curing agents, stabilizers such as carbodiimide, colorants, pigments, neutralizing agents, thickeners, non-reactive and reactive plasticizers, coalescing agents, waxes, slip and release agents, antimicrobial agents, surfactants such as Pluronic™ F68-LF and IGEPAL™ CO630 and silicone surfactants, metals, coalescents, salts, flame retardant additives (e.g., antimony oxide), antiozonants, and the like. They can optionally be added as appropriate before and/or during the processing of the dispersions of this invention into finished products as is well known to those skilled in the art. Additives may also be used as appropriate in order to make articles or to treat other products (such as by impregnation, saturation, spraying, coating, or the like). The dispersions of this invention typically have total solids of at least about 20 wt. %, preferably at least about 25 wt. % and more preferably at least about 30 wt. %.

Blends with Other Polymers and Polymer Dispersions

The dispersions of this invention can be combined with commercial polymers and polymer dispersions by methods well known to those skilled in the art. Such polymers and dispersions include those described in WIPO Publication WO 02/02657 A2, U.S. Pat. Nos. 4,920,176, 4,292,420, 6,020,438, 6,017,997 and a review article by D. P. Tate and T. W. Bethea, *Encyclopedia of Polymer Science and Engineering*, Vol. 2, p.537, the disclosures of which are incorporated herein by reference.

Hybrids

The unsaturated olefin and acrylic monomers of the aqueous dispersions of this invention can be polymerized by conventional free radical sources to form an alpha-olefin-acrylic polymer. Acrylic will refer to acrylic acid, acrylates (being esters of acrylic acid), and alkacrylates such as methacrylates and ethacrylates. Designations with (alk)acrylate will indicate that the alkyl substituents on the beta carbon of the double bond are optionally present. Additional free radically polymerizable material (unsaturated monomers) may be added to the already present unsaturated monomers in the prepolymer dispersion either to copolymerize with the already present monomers or to subsequently polymerize into a second or third vinyl polymer in the same particle. The original polyurethane particles (either with olefin-acrylic monomers present or absent) may be used as seed particles for further olefin-vinyl copolymerization. This can be done by forming the aqueous dispersions of polyurethane composite in the manner described above and then polymerizing additional monomers by emulsion or suspension polymerization in the presence of these dispersions, i.e., with the inventive dispersions being mixed with the additional monomers before polymerization is completed. Hybrids of polyurethanes and acrylics can be made to advantage by this approach. In one embodiment, the weight ratio of polymers from vinyl monomers to urethane polymers will be 10:90 to 90:10. In another embodiment, it will be 20:80 to 80:20 and in a third embodiment from 30:70 to 70:30.

Still another way of making hybrid polymers in accordance with the present invention is to include some or a portion of the ethylenically unsaturated monomers (alpha olefin and acrylic monomers) in the polyurethane prepolymer reaction system and to cause these monomer to polymerize before, during, and/or after the prepolymer is dispersed in aqueous medium. In one embodiment it is desirable to add at least 25, 50, or 75 mole % of the total alpha olefin monomer(s) to be used in the hybrid before the urethane forming components are reacted together to form a prepolymer. One or more of the acrylic monomer(s) and optional other ethylenically unsaturated monomer(s) may be added at the same time or later. This embodiment seems to promote more incorporation of the alpha olefin monomer into the olefin-acrylic copolymer than when added later. When using non-polymerized monomers, the ethylenically unsaturated monomers act as a diluent during prepolymer formation. In the aqueous medium, these ethylenically unsaturated monomers can be polymerized to completion with or without additional monomers being added. Hybrids of polyurethanes and acrylics can be made to advantage by this approach, as well.

This type of technology is taught in U.S. Pat. Nos. 4,644,030; 4,730,021; 5,137,961; and 5,371,133. Another urethane-acrylic hybrid is often known as synthetic alloy urethane-acrylic where a urethane polymer is dispersed into a waterborne polymer dispersion or emulsion. This is taught in WO 98/38249 and U.S. Pat. No. 6,022,925.

Following polymerization of the ethylenically unsaturated aliphatic olefin with the at least one ethylenically unsaturated monomer containing an electron withdrawing group, it is often desirable to reduce the volatile organic content (VOC) of the polymerization product so that downstream products from the polymer dispersion can be formulated to be compliant with various volatile organic component limitations imposed by regional governments. By VOC, according to the present invention, it is meant the sum of the residual monomers and additional volatile organic compounds (e.g., diluents and degradation products) which are determined by the chromatographic gas method. While VOC may have a different definition by different groups, a preferred definition from the *European Union Directive* 2004/42/CE for VOC emissions from varnish defines VOC as an organic compound having an initial boiling point less than or equal to 250° C. measured at a standard atmospheric pressure of 101.3 kPa. As defined hereunder; more precisely, the total VOC according to the present invention is desirably lower than 600, 500, 200, 100, 20, or 10 ppm and in particular the monomers, which are substances sometimes toxicologically harmful, lower than 500, 200,100, 50, 20, or 10 ppm. A low VOC is typically less than 500 ppm, more preferably less than 250 ppm and most preferably less than 50 ppm. There are commercial methods or technology for removing volatile organics and residual monomers such as steam stripping, coagulation and washing or drying, etc. Removing VOCs soon after polymerization also avoids more restrictive shipping and storage requirements that might be required if more significant amounts of volatile and potentially flammable organics are present in the headspace of partially filled containers, tanks, trucks, etc.

Other Additives for the Polymer. Other additives well known to those skilled in the art can be used in combination with the copolymer. Such additives include stabilizers, defoamers, antioxidants (e.g., Irganox™ 1010), UV absorbers, activators, curing agents, stabilizers such as carbodiimide, colorants, neutralizing agents, thickeners, non-reactive and reactive plasticizers, coalescing agents such as di(propylene glycol) methyl ether (DPM) and PM acetate, waxes, slip and release agents, antimicrobial agents, surfactants such as ionic and non-ionic surfactants (e.g., Pluronic™ F68-LF, IGEPAL™ CO630) and silicone surfactants, metals, salts, antiozonants, and the like.

Blends with Other Polymers and Polymer Dispersions. The polymers of this invention can be combined with commercial polymers and polymer dispersions by methods well known to those skilled in the art.

The polymer may be applied as a dispersion in a media to form a coating, adhesive, sealant, etc. It may be applied by brushing, dipping, flow coating, spraying, rolling, etc. It may contain conventional ingredients such as solvents, plasticizers, pigments, dyes, fillers, emulsifiers, surfactants, thickeners, rheology modifiers, heat and radiation stabilization additives, defoamers, levelling agents, anti-cratering agents, fillers, sedimentation inhibitors, U.V. absorbers, antioxidants, flame retardants, etc. It may contain other polymeric species such as additional polymers in the forms of blends, interpenetrating networks, etc.

In one embodiment, the polymerization temperature is 0 to about 100 or 150° C., preferably 5 to about 95° C. and more preferably about 10 to about 90° C. In one embodiment, the reactor pressure after charging the monomers and during polymerization is from atmospheric pressure (about 1 atmosphere) to about 10 atmosphere, more desirably from about atmospheric to about 2 or 3 atmosphere. In one embodiment, it is desirable that a conventionally equipped acrylate polymerization vessel designed for use at 1 or 2 atmospheres could be used so that equipment costs would not be a determent to using this technology.

In one embodiment, desirably the pH of the polymerization media would be from about 1 to about 10, 11 or 12 more desirably from about 1 to about 7, more desirably from about 2 to about 5. In another embodiment, desirably the pH of the polymerization media would be from about 5 to about 10, 11 or 12 more desirably from about 7 to about 10, more desirably from about 7.5 to about 8.5. In one embodiment, emulsifiers/dispersants/surface active molecules, to the extent necessary, would be chosen so that they performed any necessary function at the desired or selected pH.

In one embodiment, the polymerization media can be about any media that does not negatively interact with the monomers, initiators, and other components to the polymerization, and in particular including small or large amounts of water. Organic solvents (both polar and nonpolar) may be present but generally are not required. In one embodiment, the polymerization media is desirably at least 100 or 500 ppm or 1, 2, 5, 10, 15, or 20 to about 30, 50, 70, 80, 90 or 99 wt. % water based on the continuous media/aqueous media and any dispersed phase therein, e.g., monomers, surfactants, initiators, chain transfer agents, Lewis or Brönsted acid, copolymers, etc. Water, to the extent present, can be from any source, e.g., de-ionized, distilled, city water, etc.

In one embodiment, the olefin-acrylic copolymers from this process desirably have a number average molecular weight in excess of 2,000; more desirably in excess of 3,000 or 5,000; and in other embodiments desirably in excess of 10,000; 25,000; 50,000; or 100,000 grams per mole. Molecular weights as stated will be determined by GPC analysis using polystyrene standards. Molecular weights from about 25,000 and higher often typical of emulsion polymerization.

Typically, the weight average molecular weight of many polymers and polymerization mechanism will be about double the number average molecular weight. In one embodiment, desirably these copolymers will have a weight average molecular weight in excess of 4,000; more desirably in excess of 6,000 or 10,000; and in other embodiments desirably in excess of 20,000; 50,000; 100,000; or 200,000 grams per mole. These molecular weights may be claimed in combination with emulsion polymerization mechanisms.

The polymerization mechanism for the alpha-olefin acrylic copolymer can be any of those known to the art (e.g., dispersion, emulsion, bulk, solution, etc). In one embodiment, it is desirable for ease of handling of the polymer that the final copolymer (e.g., in aqueous media) be a dispersion that can be pumped and handled as a liquid. It is desirable that the number average particle size be below 5 microns, more desirable below 1 micron, and in some embodiments less than 800, less than 500; less than 300, or less than 200 nanometers in diameter. The particles sizes of less than 500 nanometers and below are typical of emulsion polymerization and may be claimed in combination with an emulsion type polymerization mechanism. The particles sizes of less than 200 nanometers and below are typical of dispersion polymerization and may be claimed in combination with a dispersion type polymerization mechanism.

Typically, one wants both olefin and acrylic co-monomers and the optional co-monomers to be chemically bonded into the same polymer chain, unless one wants an interpenetrating polymer network of two separate polymers. The copolymers can have randomly inserted monomers, alternating insertion of monomers, blocky insertion of repeating units from a single monomer, etc. As one goes from blocky insertion to random to perfectly alternating insertion, the percentage of any first type of repeating unit adjacent to another type of repeating unit increases. In one embodiment, desirable at least 5, 10, 15 or 20 weight percent of the copolymer are the sum of a) repeating units from said ethylenically unsaturated olefin are covalently bonded to at least one repeating unit from said ethylenically unsaturated monomer with electron withdrawing group (or carbonyl or nitrogen containing group) with b) repeating units from said ethylenically unsaturated monomer with electron withdrawing group covalently bonded to at least one repeating unit derived from said ethylenically unsaturated aliphatic olefin. In one embodiment, desirably at least 5, 10, 15 or 20 weight percent of the repeating units from said ethylenically unsaturated monomer with electron withdrawing group are covalently bonded to at least one repeating unit from said ethylenically unsaturated olefin. Similarly, in one embodiment, desirably at least 5, 10, 15 or 20 weight percent of the repeating units from said ethylenically unsaturated olefin are covalently bonded to repeating units from said ethylenically unsaturated monomer with electron withdrawing groups.

While not wishing to be bound by theory, the mechanism by which this copolymerization takes place is postulated to involve, sequential formation of electron poor and electron rich terminal end groups on the growing polymer resulting from alternating addition of olefin and acrylate.

A unique feature of many of the examples in this invention is that generally in the NMR analysis of polymers from this process, alternating sequences of the a) ethylenically unsaturated aliphatic olefin with 4-30 carbon atoms with the b) at least one ethylenically unsaturated monomer containing an electron withdrawing group (alternately defined in some claims as an ethylenically unsaturated monomer containing a carbonyl or nitrogen group) exist in the copolymer, often along with sequences or blocks of the b) monomer. The presence of both alternating sequences of the two types of monomers and homopolymer blocks within the same reaction product seems unique. In on embodiment, it is desirable that at least 2, 5, 10, or 20 mole percent of all the repeating units in the copolymer are the sum of said a) ethylenically unsaturated aliphatic olefin with 4 or 5 to 30 carbon atoms covalently bonded to at least one of said b) at least one ethylenically unsaturated monomer containing an electron withdrawing group (alternately defined in some claims as an ethylenically unsaturated monomer containing a carbonyl or nitrogen group) combined with said b) at least one ethylenically unsaturated monomer containing an electron withdrawing group (alternately defined in some claims as an ethylenically unsaturated monomer containing a carbonyl or nitrogen group) covalently bonded to at least one of said a) ethylenically unsaturated aliphatic olefin with 4 or 5 to 30 carbon atoms. Alternatively, in another embodiment (or in combination with the limitations above characterizing said alternating sequences), at least 2, 5, 10, or 20 mole percent of all the repeating units in the copolymer are the sum of said b) at least one ethylenically unsaturated monomer containing an electron withdrawing group (alternately defined in some claims as an ethylenically unsaturated monomer containing a carbonyl or nitrogen group) covalently bonded to repeat units from monomers other than said a) ethylenically unsaturated aliphatic olefin with 4 or 5 to 30 carbon atoms (e.g., the copolymers have the specified amount of blocks of said b) at least one ethylenically unsaturated monomer containing an electron withdrawing group (alternately defined in some claims as an ethylenically unsaturated monomer containing a carbonyl or nitrogen group) not alternating with said a) a) ethylenically unsaturated aliphatic olefin with 4 or 5 to 30 carbon atoms.

The copolymer product can be used in OEM (original equipment manufacturing) plastics including automotive and consumer electronics; weatherable coatings for building and the construction industry, adhesives, textile coatings for home furnishings and automotive, printing inks and primers for flexible packaging. It may be used as a dispersion in aqueous media or precipitated to isolated the polymer (e.g., as a dry powder, bulk polymer, or slurry) and used as an additive, impact modifier, etc., for another plastics. It is particularly useful in applications requiring additional hydrophobic character in coatings, primers, inks, compatibilizers, adhesives, sealants, caulks, textile coatings, and composite materials. The copolymers could be used in personal care, pharmaceutical or pharmacologically active formulations to change the feel, viscosity, surface character, delivery mechanism, etc., of such formulations.

The copolymer product can be used in adhesives, coatings, personal care compositions, graphic arts, and textile applications. Examples are the adhesion to both polar and non-polar substrates, high coefficient of frictions, resistance to most polar solvents, moisture repellence, printability, and compatibility with various additives. Final uses may include: inkjet receptive coatings on low-surface energy substrates (different substrates); inks for low surface-energy substrates; flock adhesives for low surface-energy substrates; coatings and binders tbr polyolefin protective apparel and ballistic articles; construction membranes and scrims for low surface-energy fibers; low dirt-pickup coatings for high and low surface-energy substrates; anti-slip coatings for flooring, packaging, construction membranes, gloves, consumer articles; moisture-resistance oxygen barrier coatings for flexible films and paper substrates; improved chemical resistance for all of the above; pressure sensitive and non pressure sensitive adhesive for rigid and flexible low surface-energy substrates; glasssizing for olefin reinforcement; soft-feel coating for plastics substrates; primer coatings for rigid and flexible low surface-energy substrates; adhesion promoter for coatings for rigid and flexible low surface-energy substrates; compatibilizing agents for mixtures of olefinic and acrylic materials; and personal care compositions of urethane-acrylic-olefin copolymers comprising one or more components selected from chelators, conditioners, diluents, fragrances, pigments, colorings, antioxidants, humectant skin and hair conditioners, lubricants, moisture barriers and emollients, neutralizers, opacifiers, pharmaceutical actives, preservatives, solvents, spreading aids, sunscreens, surfactants selected from non-ionic, anionic, cationic, and zwitterionic surfactants, conditioning polymers, vitamins, viscosity adjusters, viscosity modifiers, and emulsifiers.

EXAMPLES

Example 1

The following is an example of the preparation of a polyurethane-polyacrylate hybrid dispersion. A polyurethane prepolymer was prepared by combining 1-7 of the ingredients below at 70° C. into a 4 neck flask equipped with a thermometer, overhead stirrer and gas inlet. The reaction below was run under a stream of dry air introduced through the gas inlet on the reactor. The temperature of the reaction mixture was raised to 82° C. to 85° C. and held at this temperature for 2 hours or until the theoretical NCO % was reached as indicated by titration of a small sample.

| Item # | Material | Parts |
|---|---|---|
| 1 | Piothane 67-3000 HNA (OH# = 33.9) | 186.1 |
| 2 | Butane diol | 5.5 |
| 3 | Dimethylol butanoic acid | 21.3 |
| 4 | MMA | 125.1 |
| 5 | nBA | 25.1 |
| 6 | BHT | 0.1 |
| 7 | Di-cyclohexylmethane di-isocyanate | 136.4 |

A polyurethane dispersion was prepared by neutralizing the above prepolymer with 17.1 parts of triethylamine at 65° C.-70° C. and dispersing the neutralized prepolymer in water while maintaining the water/dispersion temperature below 28° C. The dispersed prepolymer was extended with an appropriate amount of hydrazine hydrate (35% hydrazine content) after the prepolymer was dispersed. After allowing about 30 minutes for chain extension, the temperature of the dispersion was adjusted to 33-35° C. and 3 parts of a 1% solution Fe-EDTA complex, 40 parts of aqueous 3.5% tert-butyl hydrogen peroxide, and 55 parts of 2.0% aqueous erythorbic acid neutralized with triethylamine. An exotherm resulted, which indicated initiation and polymerization of the acrylic monomer present. This resulted in a 44.0% solids polyurethane/polyacrylate dispersion with low sediment, a viscosity of 580 cps (25° C.) at a pH of 9.4. The particle size was 52.9 nm.

Example 2

The following is an example of the preparation of polyurethane/poly(aerylate-co-olefin) hybrid dispersions using MMA/BA with varied PU to acrylate-olefin copolymer ratios and acrylate to olefin ratios. A polyurethane prepolymer was prepared by combining 1-7 of the ingredients below at 70° C. into a 4 neck flask equipped with a thermometer, overhead stirrer and gas inlet. The reaction below was run under a stream of dry air introduced through the gas inlet on the reactor. The temperature of the reaction mixture was raised to 82° C. to 85° C. and held at this temperature for 2 hours or until the theoretical NCO % was reached as indicated by titration of a small sample.

| Item # | Material | Parts |
|---|---|---|
| 1 | Piothane 67-3000 HNA (OH# = 33.9) | 347.0 |
| 2 | Butane diol | 10.3 |
| 3 | Dimethylol butanoic acid | 39.7 |
| 4 | MMA | 84.0 |
| 5 | nBA | 196.1 |
| 6 | BHT | 0.2 |
| 7 | Di-cyclohexylmethane di-isocyanate | 254.6 |

A polyurethane dispersion was prepared by neutralizing the above prepolymer with 31.8 parts of triethylamine at 65° C.-70° C. and dispersing the neutralized prepolymer in water while maintaining the waterldispersion temperature below 28° C. The dispersed prepolymer was extended with an appropriate amount of hydrazine hydrate (35% hydrazine content) after the prepolymer was dispersed. The chain extension was allowed to proceed for 1 hour.

Hybrid Dispersion. The above polyurethane dispersion was combined with 2-5 of the ingredients below, and mixed for 1 hour. The temperature of the dispersion was adjusted to 32-35° C. and 3 parts of a 1% solution Fe-EDTA complex, 40 parts of aqueous 3.5% tert-butyl hydrogen peroxide, and 55 parts of 2.0% aqueous erythorbic acid neutralized with triethylamine was added. An exotherm indicating initiation and polymerization of the acrylic monomer present. This resulted in a polyurethane/poly(aerylate-co-olefin) dispersion of 40.8% solids with low sediment, a viscosity of 330 cps (25° C.) at a pH of 8.0. The particle size was 56.4 nm.

| Item # | Material | Parts |
|---|---|---|
| 1 | Polyurethane dispersion | 300 |
| 2 | H$_2$O | 69.6 |
| 3 | MMA | 13.8 |
| 4 | nBA | 32.2 |
| 5 | TMP-1 | 4.4 |

Hybrid Dispersions 2B-2D. The above procedure was repeated with the ingedients listed below to make hybrid dispersions 2B-2D of different properties.

| Hybrid dispersions | Polyurethane dispersion | H$_2$O | MMA | nBA | TMP-1 |
|---|---|---|---|---|---|
| 2B | 300 | 69.6 | 12.5 | 29.1 | 8.8 |
| 2C | 300 | 267 | 47.3 | 110.4 | 10.3 |
| 2D | 300 | 267 | 44.2 | 103.2 | 20.6 |

| | Solids (wt %) | pH | Viscosity (cps) | Particle size (nm) |
|---|---|---|---|---|
| 2B | 40.4 | 7.9 | 575 | 57.3 |
| 2C | 38.4 | 7.7 | 55 | 107.6 |
| 2D | 37.6 | 7.7 | 90 | 92.2 |

Example 3

The following is an example of the preparation of polyurethane/poly(acrylate-co-olefin) hybrid dispersions using EA with varied PU to acrylate-olefin copolymer ratios and acrylate to olefin ratios. A polyurethane prepolymer was prepared by combining 1-6 of the ingredients below at 70° C. into a 4 neck flask equipped with a thermometer, overhead stirrer and gas inlet. The reaction below was run under a stream of dry air introduced through the gas inlet on the reactor. The temperature of the reaction mixture was raised to 82° C. to 85° C. and held at this temperature for 2 hours or until the theoretical NCO % was reached as indicated by titration of a small sample.

| Item # | Material | Parts |
| --- | --- | --- |
| 1 | Piothane 67-3000 HNA (OH# = 33.9) | 347.0 |
| 2 | Butane diol | 10.3 |
| 3 | Dimethylol butanoic acid | 39.7 |
| 4 | EA | 280.1 |
| 5 | BHT | 0.2 |
| 6 | Di-cyclohexylmethane di-isocyanate | 254.6 |

A polyurethane dispersion was prepared by neutralizing the above prepolymer with 31.8 parts of triethylamine 65° C.-70° C. and dispersing the neutralized prepolymer in water while maintaining the water/dispersion temperature below 28° C. The dispersed prepolymer was extended with an appropriate amount of hydrazine hydrate (35% hydrazine content) after the prepolymer was dispersed. The chain extension was allowed to proceed for 1 hour.

Hybrid Dispersion 3A-3D. The same procedure as in the preparation of hybrid dispersion 2A was repeated with the ingredients listed below to make hybrid dispersions 3A-3D of different properties.

| Hybrid dispersions | Polyurethane dispersion | $H_2O$ | EA | TMP-1 |
| --- | --- | --- | --- | --- |
| 3A | 300 | 69.6 | 37.2 | 13.2 |
| 3B | 300 | 69.6 | 32.8 | 17.6 |
| 3C | 300 | 267 | 137.1 | 30.9 |
| 3D | 300 | 267 | 126.8 | 41.2 |

| | Solids (wt %) | pH | Viscosity (cps) | Particle size (nm) |
| --- | --- | --- | --- | --- |
| 3A | 40.0 | 8.0 | 4300 | 53.6 |
| 3B | 38.8 | 8.0 | 4050 | 54.4 |
| 3C | 37.0 | 7.5 | 2350 | 65.4 |
| 3D | 35.4 | 7.7 | 1525 | 65.6 |

Hybrid Dispersion 3E-3F. The same procedure as in the preparation of hybrid dispersion 2A was repeated with the ingredients listed below to make hybrid dispersions 3E-3F with dodecene and octadecene.

| Hybrid dispersions | Polyurethane dispersion | $H_2O$ | EA | Olefin | |
| --- | --- | --- | --- | --- | --- |
| 3E | 100 | 76.4 | 54.9 | dodecene | 13.7 |
| 3F | 100 | 76.4 | 54.9 | octadecene | 13.7 |

| | Solids (wt %) | pH | Viscosity (cps) | Particle size (nm) |
| --- | --- | --- | --- | --- |
| 3E | 34.4 | 7.7 | 100 | 64.6 |
| 3F | 42.8 | 7.7 | 7200 | 63.3 |

Example 4

The following is an example of the preparation of polyurethane/poly(acrylate-co-olefin) hybrid dispersions using nBA with various olefins. A polyurethane prepolymer was prepared by combining 1-6 of the ingredients below at 70° C. into a 4 neck flask equipped with a thermometer, overhead stirrer and gas inlet. The reaction below was run under a stream of dry air introduced through the gas inlet on the reactor. The temperature of the reaction mixture was raised to 82° C. to 85° C. and held at this temperature for 2 hours or until the theoretical NCO % was reached as indicated by titration of a small sample.

| Item # | Material | Parts |
| --- | --- | --- |
| 1 | Piothane 67-3000 HNA (OH# = 36.7) | 347.0 |
| 2 | Butane diol | 10.3 |
| 3 | Dimethylolbutanoic acid | 39.7 |
| 4 | nBA | 280.1 |
| 5 | BHT | 0.2 |
| 6 | Di-cyclohexylmethane di-isocyanate | 257.0 |

A polyurethane dispersion was prepared by neutralizing the above prepolymer with 31.8 parts of triethylamine at 65° C.-70° C. and dispersing the neutralized prepolymer in water while maintaining the water/dispersion temperature below 28° C. The dispersed prepolymer was extended with an appropriate amount of hydrazine hydrate (35% hydrazine content) after the prepolymer was dispersed. The chain extension was allowed to proceed for 1 hour.

Hybrid Dispersion 4A. Initiator A was made by dissolving 0.6 grams of erythorbic acid and 0.3 grams of triethylamine in 30.0 grams of water. Initiator B was made by dissolving 2 grams of 30% SLS solution and 8.8 grams of 17% t-butyl hydroperoxide in 30 grams of water. Approximately 510.2 grams of the above polyurethane dispersion, 6 grams of 1% Fe-EDTA solution and 518.6 grams of water was charged into a 3 L reactor vessel and heated to 60° C. Initiator A was then added into the reactor, followed by proportioning the initiator B into the vessel over a period of 3 hours and 235.7 grams of n-butyl acrylate over a period of 2.5 hours. The reaction was allowed to proceed for 30 minutes after the completion of the addition, and then cooled to 57° C. A mixture of 1.8 grams of 17% t-butyl hydroperoxide and 30 grams of water was added into the reactor. After 5 minutes, a mixture of 0.24 grams of erythobic acid, 0.12 triethylamine and 30 grams of water was added into the reactor. After 2 hours, the reaction vessel was cooled to room temperature and filtered through 100-micro cloth. A polyurethane/poly(acrylate-co-olefin) dispersion of 31.3% solids was obtained with low sediment, a viscosity of 18 cps (25° C.) at a pH of 8.0. The particle size was 68.7 nm.

Hybrid dispersion 4B-4D. The same procedure as in the preparation of hybrid dispersion 4A was repeated with the ingredients listed below to make hybrid dispersions 4B-4D of different properties.

| Hybrid dispersions | Olefin in reactor | | nBA |
| --- | --- | --- | --- |
| | Olefin | Parts | |
| 4B | TMP-1 | 60 | 175.7 |
| 4C | dodecene | 60 | 175.7 |
| 4D | hexadecene | 60 | 175.7 |

-continued

|     | Solids (wt %) | pH  | Viscosity (cps) | Particle size (nm) |
| --- | --- | --- | --- | --- |
| 4B  | 30.7 | 8.1 | 15 | 193.6 |
| 4C  | 29.5 | 7.9 | 20 | 66.2 |
| 4D  | 28.6 | 7.9 | 15 | 64.7 |

Example 5

The following is an example of the preparation of polyurethane/poly(acrylate-co-olefin) hybrid dispersions using EA and dodecene. A polyurethane prepolymer was prepared by combining 1-7 of the ingredients below at 70° C. into a 4 neck flask equipped with a thermometer, overhead stirrer and gas inlet. The reaction below was run under a stream of dry air introduced through the gas inlet on the reactor. The temperature of the reaction mixture was raised to 82° C. to 85° C., and held at this temperature for 2 hours or until the theoretical NCO % was reached as indicated by titration of a small sample.

| Item # | Material | Parts |
| --- | --- | --- |
| 1 | Piothane 67-3000 HNA (OH# = 36.7) | 186.1 |
| 2 | Butane diol | 5.5 |
| 3 | Dimethylolbutanoic acid | 21.3 |
| 4 | Dodecene | 92.0 |
| 5 | EA | 58.2 |
| 6 | BHT | 0.1 |
| 7 | Di-cyclohexylmethane di-isocyanate | 137.7 |

A polyurethane dispersion was prepared by neutralizing the above prepolymer with 17:1 parts of triethylamine at 65° C.-70° C. and dispersing the neutralized prepolymer in water while maintaining the water/dispersion temperature below 28° C. The dispersed prepolymer was extended with an appropriate amount of hydrazine hydrate (35% hydrazine content) after the prepolymer was dispersed. The chain extension was allowed to proceed for 1 hour.

Hybrid Dispersion 5A. The above polyurethane dispersion was combined with 2-3 of the ingredients below, and mixed for 1 hour. The temperature of the dispersion was adjusted to 32-35° C. and 3 parts of a 1% solution Fe-EDTA complex, 40 parts of aqueous 3.5% tert-butyl hydrogen peroxide, and 55 parts of 2.0% aqueous erythorbic acid neutralized with triethylamine was added. An exotherm resulted, which indicated initiation and polymerization of the acrylic monomer present. This resulted in a polyurethane/poly(acrylate-co-olefin) dispersion of 36.0% solids with low sediment, a viscosity of 75 cps (25° C.) at a pH of 7.6. The particle size was 79.6 nm.

| Item # | Material | Parts |
| --- | --- | --- |
| 1 | Polyurethane dispersion | 100 |
| 2 | H₂O | 89 |
| 3 | Ethyl acrylate | 56 |

Hybrid Dispersion 5B. Initiator A was made by dissolving 0.6 grams of erythorbic acid and 0.3 grams of triethylamine in 30.0 grams of water. Initiator B was made by dissolving 2 grams of 30% SLS solution and 8.8 grams of 17% t-butyl hydroperoxide in 30 grams of water. Approximately 450.0 grams of the above polyurethane dispersion, 18.2 grams of dodecene, 6 grams of 1% Fe-EDTA solution and 438.0 grams of water was charged into a 3 L reactor vessel and heated to 60° C. Initiator A was then added into the reactor, followed by proportioning the initiator B into the vessel over a period of 3 hours and 189.7 grams of ethyl acrylate over a period of 2.5 hours. The reaction was allowed to proceed for 30 minutes after the completion of the addition, and then cooled to 57° C. A mixture of 1.8 grams of 17% t-butyl hydroperoxide and 30 grams of water was added into the reactor. After 5 minutes, a mixture of 0.24 grams of erythobic acid, 0.12 triethylamine and 30 grams of water was added into the reactor. After 2 hours, the reaction vessel was cooled to room temperature and filtered through 100-micro cloth. A polyurethane/poly(acrylate-co-olefin) dispersion of 30.0% solids was obtained with low sediment, a viscosity of 18 cps (25° C.) at a pH of 7.9. The particle size was 68.5 nm.

Hybrid Dispersion 5C. Initiator A was made by dissolving 0.6 grams of erythorbic acid and 0.3 grams of triethylamine in 30.0 grams of water. Initiator B was made by dissolving 2 grams of 30% SLS solution and 8.8 grams of 17% t-butyl hydroperoxide in 30 grams of water. Approximately 450.0 grams of the above polyurethane dispersion (Example 5), 6 grams of 1% Fe-EDTA solution and 438.0 grams of water was charged into a 3 L reactor vessel and heated to 60° C. Initiator A was then added into the reactor, followed by proportioning the initiator B into the vessel over a period of 3 hours and 207.9 grams of ethyl acrylate over a period of 2.5 hours. The reaction was allowed to proceed for 30 minutes after the completion of the addition, and then cooled to 57° C. A mixture of 1.8 grams of 17% t-butyl hydroperoxide and 30 grams of water was added into the reactor. After 5 minutes, a mixture of 0.24 grams of erythobie acid, 0.12 triethylamine and 30 grams of water was added into the reactor. After 2 hours, the reaction vessel was cooled to room temperature and filtered through 100-micro cloth. A polyurethane/poly(acrylate-co-olefin) dispersion of 30.5% solids was obtained with low sediment, a viscosity of 18 cps (25° C.) at a pH of 8.0. The particle size was 68.7 nm.

Comparative Example 6

The following is an example of the preparation of polyurethane/poly(acrylate) hybrid dispersions using nBA in presence of surfactant. A monomer premix was made by mixing 75 grams of water, 10 grams of 30% SLS solution, 210 grams of nBA, 7.5 grams of MAA, and 82.5 grams of MMA. Initiator A was made by dissolving 0.6 grams of erythorbic acid in 30.0 grams of water. Initiator B was made by dissolving 2 grams of 30% SLS solution and 8.8 grams of 17% t-butyl hydroperoxide in 30 grams of water. Approximately 468.8 grams of the seed polyurethane polymer Permax 230, 485 grams of water, 20 grams of 30% SLS solution, and 6 grams of 1% Fe-EDTA solution and was charged into a 3L reactor vessel and heated to 60° C. Initiator A was then added into the reactor, followed by proportioning the initiator B into the vessel over a period of 3 hours and the monomer premix over a period of 2.5 hours. The reaction was allowed to proceed for 30 minutes after the completion of the addition, and then cooled to 57° C. A mixture of 1.8 grams of 17% t-butyl hydroperoxide and 30 grams of water was added into the reactor. After 5 minutes, a mixture of 0.24 grams of erythobic acid, and 30 grams of water was added into the reactor. After 2 hours, the reaction vessel was cooled to room temperature and filtered through 100-micro cloth. A polyurethane/poly(acrylate-co-olefin) dispersion of 28.9% solids was obtained with low sediment, a viscosity of 75 cps (25° C.) at a pH of 5.8. The particle size was 160.8 nm.

Example 7

The following is an example of the preparation of polyurethane/poly(aerylate-co-olefin) hybrid dispersions using nBA and TMP-1 in presence of surfactant. A monomer premix was made by mixing 75 grams of water, 10 grams of 30% SLS solution, 210 grams of nBA, 15 grams of TMP-1, 7.5 grams of MAA, and 82.5 grams of MMA. Initiator A was made by dissolving 0.6 grams of erythorbic acid in 30.0 grams of water. Initiator B was made by dissolving 2 grams of 30% SLS solution and 8.8 grams of 17% t-butyl hydroperoxide in 30 grams of water, Approximately 468.8 grams of the seed polyurethane polymer Permax 230, 485 grams of water, 20 grams of 30% SLS solution, and 6 grams of 1% Fe-EDTA solution was charged into a 3L reactor vessel and heated to 60° C. Initiator A was then added into the reactor, followed by proportioning the initiator B into the vessel over a period of 3 hours and the monomer premix over a period of 2.5 hours. The reaction was allowed to proceed for 30 minutes after the completion of the addition, and then cooled to 57° C. A mixture of 1.8 grams of 17% t-butyl hydroperoxide and 30 grams of water was added into the reactor. After 5 minutes, a mixture of 0.24 grams of erythobic acid, and 30 grams of water was added into the reactor. After 2 hours, the reaction vessel was cooled to room temperature and filtered through 100-micro cloth. A polyurethane/poly(acrylate-co-olefin) dispersion of 28.7% solids was obtained with low sediment, a viscosity of 78 cps (25° C.) at a pH of 5.7. The particle size was 154.3 nm.

Abbreviations of the Chemicals Used in Examples
MMA: methyl methacrylate
EA: ethyl acrylate
nBA: n-butyl acrylate
TMP-1: 2,4,4-triinethyl-1-pentene
BHT: 2,6-Di-tert-butyl-4-methylphenol
SLS: sodium lauryl sulfate
Piothane 67-3000 HNA®: polyester diol reaction product of hexane diol, neopentyl glycol, and adipic acid (average MW=3000) from Panolam Industries
Fe-EDTA: mixture of ferrous sulfate and 2-[2-(Bis(carboxymethyl)amino)ethyl-(carboxymethyl)amino]acetic acid
Permax 230®: polyurethane dispersion available from Lubrizol Advanced Materials.
PU: polyurethane

APPENDIX

Compositions of the Hybrid Dispersions

| Hybrid Dispersions | Compositions | Particle size nm |
| --- | --- | --- |
| 1 | 83.3 MMA/16.7 nBA//233.3 PU | 53 |
| 2A | 28.5 MMA/66.5 nBA/5.0 TMP-1//100.0 PU | 56 |
| 2B | 27.0 MMA/63.0 nBA/10.0 TMP-1//100.0 PU | 57 |
| 2C | 28.5 MMA/66.5 nBA/5.0 TMP-1//42.9 PU | 108 |
| 2D | 27.0 MMA/63.0 nBA/10.0 TMP-1//42.9 PU | 92 |
| 3A | 85.0 EA/15.0 TMP-1//100.0 PU | 54 |
| 3B | 80.0 EA/20.0 TMP-1//100.0 PU | 54 |
| 3C | 85.0 EA/15.0 TMP-1//42.9 PU | 65 |
| 3D | 80.0 EA/20.0 TMP-1//42.9 PU | 66 |
| 3E | 83.1 EA/16.9 Dodecene//36.2 PU | 65 |
| 3F | 83.1 EA/16.9 Octadecene//36.2 PU | 63 |
| 4A | 100.0 nBA//50.0 PU | 69 |
| 4B | 80.0 nBA/20.0 TMP-1//50 PU | 194 |
| 4C | 80.0 nBA/20.0 Dodecene//50 PU | 66 |

APPENDIX-continued

Compositions of the Hybrid Dispersions

| Hybrid Dispersions | Compositions | Particle size nm |
| --- | --- | --- |
| 4D | 80.0 nBA/20.0 Hexadecene//50 PU | 65 |
| 5A | 88.8 EA/11.2 Dodecene//42.9 PU | 80 |
| 5B | 80.0 EA/20.0 Dodecene//50 PU | 69 |
| 5C | 86.9 EA/13.1 Dodecene//50 PU | 69 |
| 6 | 70.0 nBA/27.5 MMA/2.5 MAA//50 PU | 161 |
| 7 | 66.5 nBA/26.0 MMA/2.5 MAA/5 TMP-1//50 PU | 154 |

The above samples are currently undergoing evaluation for property composition relationships. Based on separate analysis of the alpha-olefin-acrylic portion of the blend, we expect lower surface tension on the resulting films attributable to the alpha-olefin monomer's low surface tension. The alpha-olefin is also expected to make to blends more hydrophobic meaning that water and other polar materials will have a higher contact angle (i.e., they will not wet the surface well) when they forms drops on a surface or film from the blend. It is also anticipated that due to the hydrophobic low surface energy of the blend that it will more effectively wet a variety of equivalent or higher surface energy substrates, e.g., thermoplastic olefins, polyolefins, etc. It is also anticipated that the solid articles and films from the blends will have lower swelling factors and absorb less polar solvents that equivalent blends of polymers where an alpha-olefin component has not been copolymerized into the acrylic copolymer (this is sometimes call solvent resistance, especially resistance to polar solvents such as C1-C3 alcohols, glycols, diglycols, diglycol ethers, and alkyl ketones such as methylethylketone). Due to better wetting of non-polar hydrophobic surfaces it is anticipated that the blends of this disclosure will develop better adhesion to such non-polar substrates than compositionally similar urethane-acrylic blends that lack repeating units derived from polymerizing alpha-olefins. The alpha-olefin monomer's contribution to these properties is slightly different than a similarly sized (same number of carbon atoms in the hydrocarbon group) alkyl group on an acrylate (e.g., ethylhexyl acrylate has a large C8 alkyl group). Thus, the benefits of the alpha-olefin go beyond just changing the hydrophobicity of the copolymer.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:
1. A urethane-olefin-acrylic polymeric reaction product as a interpenetrating polymer network of the polyurethane and polyolefin-acrylic dispersion in aqueous media comprising:
   a) a urethane prepolymer derived from reacting at least polyisocyanates with one or more active-hydrogen containing compounds,
   b) an olefin-acrylic copolymer derived from free radically polymerizing b1) at least one ethylenically unsaturated aliphatic olefin with 2 to 30 carbon atoms with b2) at least one ethylenically unsaturated monomer containing an electron withdrawing group, and b3) optionally with other ethylenically unsaturated monomers, wherein said b1), b2), and optional b3) form said olefin-acrylic copolymer comprising repeating units within the same copolymer from said olefin and said monomer containing an electron withdrawing group.

2. The urethane-olefin-acrylic polymeric reaction product according to claim 1, wherein said ethylenically unsaturated aliphatic olefin has from 4 to 20 carbon atoms.

3. The urethane-olefin-acrylic polymeric reaction product according to claim 2 wherein said ethylenically unsaturated aliphatic olefin has from 5 to 20 carbon atoms.

4. The urethane-olefin-acrylic polymeric reaction product according to claim 2, wherein said olefin-acrylic copolymer and said urethane prepolymer form a hybrid copolymer dispersion.

5. The urethane-olefin-acrylic polymeric reaction product according to claim 4, wherein said aliphatic olefin-acrylic copolymer comprises 5-50 wt.% repeating units derived from said ethylenically unsaturated aliphatic olefin.

6. The urethane-olefin-acrylic polymeric reaction product according to claim 4, wherein said urethane prepolymer was chain extended with a difunctional or higher amine prior to copolymerizing said a) at least one ethylenically unsaturated aliphatic olefin with 4 to 20 carbon atoms with b) at least one ethylenically unsaturated monomer containing an electron withdrawing group.

7. The urethane-olefin-acrylic polymeric reaction product according to claim 4, wherein said aqueous polyurethane dispersion was chain extended with a difunctional or higher amine subsequent to copolymerizing said a) at least one ethylenically unsaturated aliphatic olefin with 4 to 20 carbon atoms with b) at least one ethylenically unsaturated monomer containing an electron withdrawing group.

8. The urethane-olefin-acrylic polymeric reaction product according to claim 4, wherein said olefin-acrylic copolymer comprises at least 3 weight percent polymeric units derived from said at least one ethylenically unsaturated aliphatic olefin with 4 to 30 carbon atoms.

9. A process for copolymerizing ethylenically unsaturated aliphatic olefin with ethylenically unsaturated monomer containing an electron withdrawing groups into an alpha-olefin-acrylic copolymer comprising:
   a) bulk or solution polymerizing polyisocyanates and active hydrogen-containing compounds to form a prepolymer,
   b) dispersing said prepolymer in water to form an aqueous polyurethane dispersion,
   c) copolymerizing in the presence of an aqueous polyurethane dispersion at least one ethylenically unsaturated aliphatic olefin monomer with 2 to 30 carbon atoms with at least one ethylenically unsaturated monomer containing an electron withdrawing group forming a olefin-acrylic copolymer wherein said polyurethane dispersion and polyolefin-acrylic copolymer are in the form of an interpenetrating polymer network according to claim 1, optionally utilizing a Lewis or Brönsted acid to increase the incorporation rate of said olefin into said copolymer.

10. The process according to claim 9, wherein said copolymerization involves a free radical as at least part of the propagating species and wherein said at least one ethylenically unsaturated aliphatic olefin monomer has 4 to 30 carbon atoms.

11. The process according to claim 10, wherein said olefin-acrylic copolymer comprises at least 3 wt. % of polymeric units derived from said at least one ethylenically unsaturated aliphatic olefin monomer.

12. The process according to claim 11, wherein said olefin-acrylic copolymer comprises at least 5 wt. % of polymeric units derived from said at least one ethylenically unsaturated aliphatic olefin monomer.

13. The process according to claim 11, wherein at least 50 wt.% of said at least one ethylenically unsaturated aliphatic olefin monomers are ethylenically unsaturated aliphatic olefin monomers having from 6 to 15 carbon atoms.

14. The process according to claim 10, wherein said alpha-olefin-acrylic copolymer is generally characterized by a number average molecular weight in excess of 10,000 grams/mole as determined by GPC.

15. The process according to claim 10, wherein said olefin-acrylic copolymer is generated in the form of a stable emulsion or dispersion in an aqueous media.

16. The process according to claim 10, wherein said emulsion or dispersion is characterized by a volume average particle size of less than 200 nanometers in diameter.

17. An adhesion promoter for adhesives, coatings, and inks, comprising:
   a reaction product according to claim 1, wherein said reaction product of olefin and acrylic monomers or olefin-acrylic copolymer is characterized by a number average molecular weight as determined by GPC is at least 10,000 grams/mole.

18. The polymeric reaction product according to claim 1 from polymerizing a) at least one ethylenically unsaturated aliphatic olefin with 2 to 30 carbon atoms with b) at least one ethylenically unsaturated monomer containing an electron withdrawing group in the presence of an aqueous polyurethane dispersion, forming a alpha-olefin-acrylic copolymer comprising repeating units within the same copolymer from said olefin and said monomer containing an electron withdrawing group.

19. The polymeric reaction product according to claim 1, derived from reacting at least polyisocyanates with one or more active-hydrogen containing compounds and dispersing the resulting urethane prepolymer in an olefin-acrylic emulsion formed by emulsion copolymerization of said at least one ethylenically unsaturated aliphatic olefin and at least said at least one ethylenically unsaturated monomer containing an electron withdrawing group.

20. The polymeric reaction product according to claim 1, in the form of an alpha-olefin-acrylic emulsion further comprising a separately manufactured polyurethane dispersion derived from reacting at least polyisocyanates with one or more active-hydrogen containing compounds forming a prepolymer and dispersing said prepolymer into water and blending the polyurethane dispersion with an emulsion of said alpha-olefin-acrylic copolymer.

21. The polymeric reaction product of claim 18, wherein at least 25 wt.% of the total ethylenically unsaturated aliphatic olefin monomer with 2 to 30 carbon atoms is added to urethane forming components and subsequently to the addition of said ethylenically unsaturated aliphatic olefin said urethane forming components are reacted to for a prepolymer, which is subsequently dispersed in water to form said aqueous polyurethane dispersion.

* * * * *